(12) United States Patent
Greiner et al.

(10) Patent No.: US 11,809,870 B2
(45) Date of Patent: *Nov. 7, 2023

(54) FUNCTION VIRTUALIZATION FACILITY FOR BLOCKING INSTRUCTION FUNCTION OF A MULTI-FUNCTION INSTRUCTION OF A VIRTUAL PROCESSOR

(71) Applicant: INTERNATIONAL BUSINESS MACHINES CORPORATION, Armonk, NY (US)

(72) Inventors: Dan Greiner, San Jose, CA (US);
Damian Osisek, Vestal, NY (US);
Timothy Slegel, Staatsburg, NY (US);
Lisa Cranton Heller, Rhinebeck, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/224,373

(22) Filed: Apr. 7, 2021

(65) Prior Publication Data
US 2021/0255867 A1  Aug. 19, 2021

Related U.S. Application Data

(63) Continuation of application No. 16/538,955, filed on Aug. 13, 2019, now Pat. No. 11,086,624, which is a
(Continued)

(51) Int. Cl.
*G06F 9/30* (2018.01)
*G06F 9/455* (2018.01)

(52) U.S. Cl.
CPC ...... *G06F 9/30145* (2013.01); *G06F 9/30167* (2013.01); *G06F 9/45541* (2013.01); *G06F 9/45554* (2013.01)

(58) Field of Classification Search
CPC ............ G06F 9/45533; G06F 9/45554; G06F 9/30145; G06F 9/30167; G06F 9/45541
See application file for complete search history.

(56) References Cited

U.S. PATENT DOCUMENTS

| | | |
|---|---|---|
| 3,626,427 A | 12/1971 | MacSorley |
| 5,551,013 A | 8/1996 | Beausoleil et al. |
| (Continued) | | |

FOREIGN PATENT DOCUMENTS

| | | | |
|---|---|---|---|
| JP | S60159948 A | 8/1985 | |
| JP | S62123552 A | 6/1987 | |
| (Continued) | | | |

OTHER PUBLICATIONS

Shioda, Shinji, "The Virtualization Technology In 2009 Become Like This !," Network Magazine, ASCII Media Works Inc., vol. 14, No. 2, Feb. 10, 2009, pp. 114-117.
(Continued)

*Primary Examiner* — Jacob Petranek
(74) *Attorney, Agent, or Firm* — Edward J. Wixted, III, Esq.; Blanche E. Schiller, Esq.; Heslin Rothenberg Farley & Mesiti P.C.

(57) ABSTRACT

In a processor supporting execution of a plurality of functions of an instruction, an instruction blocking value is set for blocking one or more of the plurality of functions, such that an attempt to execute one of the blocked functions, will result in a program exception and the instruction will not execute, however the same instruction will be able to execute any of the functions that are not blocked functions.

25 Claims, 21 Drawing Sheets

Related U.S. Application Data continuation of application No. 12/822,368, filed on Jun. 24, 2010, now Pat. No. 10,521,231.

(56) References Cited

U.S. PATENT DOCUMENTS

| | | | |
|---|---|---|---|
| 5,574,873 A | 11/1996 | Davidian | |
| 5,632,028 A | 5/1997 | Thusoo et al. | |
| 5,640,503 A | 6/1997 | Alpert et al. | |
| 5,651,122 A * | 7/1997 | Hartung | G06F 9/30145 |
| | | | 712/E9.028 |
| 5,758,140 A | 5/1998 | Kahle | |
| 5,790,825 A | 8/1998 | Traut | |
| 6,009,261 A | 12/1999 | Scalzi et al. | |
| 6,076,156 A | 6/2000 | Pickett | |
| 6,092,185 A | 7/2000 | Slegel | |
| 6,138,229 A | 10/2000 | Kucukcakar | |
| 6,185,670 B1 | 2/2001 | Huff | |
| 6,308,255 B1 | 10/2001 | Gorishek, IV et al. | |
| 6,427,202 B1 | 7/2002 | Richardson et al. | |
| 6,463,582 B1 | 10/2002 | Lethin et al. | |
| 7,493,483 B2 | 2/2009 | McIntosh | |
| 7,689,311 B2 | 3/2010 | Ruml et al. | |
| 7,725,736 B2 | 5/2010 | Lundvall et al. | |
| 7,802,252 B2 | 9/2010 | Armstrong et al. | |
| 7,865,948 B1 | 1/2011 | Barnes et al. | |
| 7,925,923 B1 | 4/2011 | Hyser et al. | |
| 7,984,108 B2 | 7/2011 | Landis et al. | |
| 8,321,849 B2 | 11/2012 | Nickolls | |
| 8,479,195 B2 | 7/2013 | Adams et al. | |
| 8,572,606 B1 | 10/2013 | Agesen et al. | |
| 9,851,969 B2 | 12/2017 | Greiner et al. | |
| 10,521,231 B2 | 12/2019 | Greiner et al. | |
| 2004/0031022 A1 | 2/2004 | Kabasawa et al. | |
| 2004/0230814 A1 | 11/2004 | Lundvall | |
| 2004/0230816 A1 | 11/2004 | Lundvall | |
| 2005/0102489 A1 | 5/2005 | Kim | |
| 2005/0188171 A1 | 8/2005 | McIntosh | |
| 2005/0251652 A1 | 11/2005 | Nallusamy | |
| 2005/0289542 A1 | 12/2005 | Uhlig | |
| 2007/0028244 A1 | 2/2007 | Laudis et al. | |
| 2008/0148016 A1 * | 6/2008 | Abe | G06F 9/32 |
| | | | 712/205 |
| 2008/0201554 A1 | 8/2008 | Lundvall | |
| 2008/0263407 A1 | 10/2008 | Yamamoto | |
| 2009/0070760 A1 | 2/2009 | Khatri et al. | |
| 2009/0222814 A1 | 9/2009 | Astrand | |
| 2010/0138828 A1 | 6/2010 | Hanquez et al. | |
| 2010/0153690 A1 * | 6/2010 | Vick | G06F 9/384 |
| | | | 712/E9.023 |
| 2010/0257338 A1 | 10/2010 | Spracklen | |
| 2011/0320773 A1 | 12/2011 | Greiner et al. | |
| 2011/0320825 A1 | 12/2011 | Greiner et al. | |
| 2018/0107480 A1 | 4/2018 | Greiner et al. | |

FOREIGN PATENT DOCUMENTS

| | | | |
|---|---|---|---|
| JP | 2004127255 | A | 4/2004 |
| JP | 2005149361 | A | 6/2005 |
| JP | 2005242510 | A | 9/2005 |
| JP | 2006221606 | A | 8/2006 |
| KR | 930006542 | B1 | 7/1993 |
| KR | 19970059922 | A | 8/1997 |

OTHER PUBLICATIONS

Edel et al., "Dynamic Instruction Set Definition," IBM Technical Disclosure Bulletin, vol. 16, No. 6, Nov. 1973, pp. 1-2 (+cover).

TurboHercules Welcome, Sep. 2, 2011, XP002616628. www.turbohercules.com, p. 1.

Flex-ES The New Mainframe (System/390 on Intel-based Servers), www.funsoft.com, Copyright 1998-2012, downloaded from www.funsoft.com Aug. 16, 2018 (no further date information available) p. 1-27.

The Hercules System 370, ESA/390 and z/Architecture Emulator, 222.hercules-390.org, XP002616629, Jan. 2011, pp. 1-6.

PCT International Search Report and Written Opinion for PCT/EP2011/067046 dated Feb. 3, 2011, pp. 1-13.

Altman, et al., "DAISY: Dynamic Compilation for 100% Architectural Compatibility," ACM SIGARCH Computer Architecture News—Special Issue: Proceedings of the 24th annual international symposium on Computer architecture (ISCA '97) Homepage, vol. 25—Issue 2, May 1997, pp. 26-37.

Intel, "Intel Itanium Architecture Software Developer's Manual—vol. 2," May 2010, pp. 1-676.

IBM, "z/Architecture—Principles of Operation, " 8$^{th}$ Edition, SA22-7832-07, Feb. 2009, pp. 1-1344.

Nikkei Byte, Nikkei Business Publications, Inc., Publication No. 2013-515735, Oct. 26, 2014, pp. 1-7.

PCT International Search Report and Written Opinion for PCT/EP2010/067045 dated Feb. 4, 2011, pp. 1-13.

AMD, "Live Migration with AMD-V Extended Migration Technology," Advanced Micro Devices, Publication No. 43781, Rev. Apr. 3, 2008, pp. 1-17.

VMWare VMotion and CPU Compatibility, VMWare Information Guide, Jun. 6, 2008, pp. 1-14.

* cited by examiner

Example
z/Architecture
Instruction
Formats

| Op | R1 | R2 | 901

| Op | 902

| Op | R1 | X2 | B2 | D2 | 903

| Op | B2 | D2 | 904

| Op | M1 | Op | I2 | 905

| Op | R1 | X2 | B2 | DL2 | DH2 | Op | 906

| ---- | ML | FCx |
| ---- | ML | FCx |
| ---- | ML | FCx |
| ---- | ML | FCx |
| ---- | ML | FCx |
| ---- | ML | FCx |
| ---- | ML | FCx |
| ---- | ML | FCx |

Opcode Table 907

FIG. 8

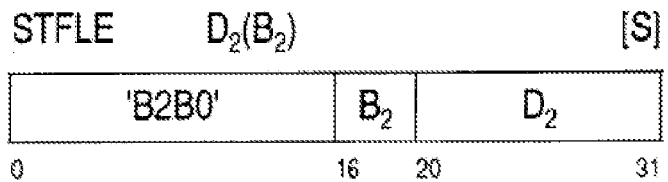
FIG. 16
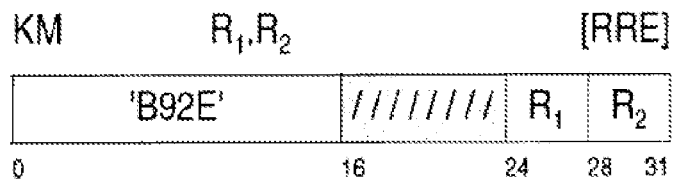
FIG. 17
The function codes for CIPHER MESSAGE are as follows.
| Code | Function | Parm. Block Size (bytes) | Data Block Size (bytes) |
|---|---|---|---|
| 0 | KM-Query | 16 | — |
| 1 | KM-DEA | 8 | 8 |
| 2 | KM-TDEA-128 | 16 | 8 |
| 3 | KM-TDEA-192 | 24 | 8 |
| 18 | KM-AES-128 | 16 | 16 |
| 19 | KM-AES-192 | 24 | 16 |
| 20 | KM-AES-256 | 32 | 16 |
Explanation:
— Not applicable
FIG. 18

FUNCTION VIRTUALIZATION FACILITY FOR BLOCKING INSTRUCTION FUNCTION OF A MULTI-FUNCTION INSTRUCTION OF A VIRTUAL PROCESSOR

This application is a continuation of co-pending U.S. patent application Ser. No. 16/538,955, entitled "FUNCTION VIRTUALIZATION FACILITY FOR BLOCKING INSTRUCTION FUNCTION OF A MULTI-FUNCTION INSTRUCTION OF A VIRTUAL PROCESSOR," filed Aug. 13, 2019, which is a continuation of U.S. Pat. No. 10,521,231, entitled "FUNCTION VIRTUALIZATION FACILITY FOR BLOCKING INSTRUCTION FUNCTION OF A MULTI-FUNCTION INSTRUCTION OF A VIRTUAL PROCESSOR," issued Dec. 31, 2019, each of which is hereby incorporated herein by reference in its entirety.

BACKGROUND

The present invention is related to computer systems and more particularly to computer system processor instruction functionality.

Trademarks. IBM® is a registered trademark of International Business Machines Corporation, Armonk, N.Y., U.S.A. S/390, z900, z990 and z10 and other product names may be registered trademarks or product names of International Business Machines Corporation or other companies.

IBM has created through the work of many highly talented engineers beginning with machines known as the IBM® System 360 in the 1960s to the present, a special architecture which, because of its essential nature to a computing system, became known as "the mainframe" whose principles of operation state the architecture of the machine by describing the instructions which may be executed upon the "mainframe" implementation of the instructions which had been invented by IBM inventors and adopted, because of their significant contribution to improving the state of the computing machine represented by "the mainframe", as significant contributions by inclusion in IBM's Principles of Operation as stated over the years. The Eighth Edition of the IBM® z/Architecture® Principles of Operation which was published February, 2009 has become the standard published reference as SA22-7832-07 and is incorporated in IBM's z10® mainframe servers. The IBM Z/Architecture® Principles of Operation, Publication SA22-7832-07 is incorporated by reference in its entirety herein.

Referring to FIG. 1A, representative components of a prior art Host Computer system 50 are portrayed. Other arrangements of components may also be employed in a computer system, which are well known in the art. The representative Host Computer 50 comprises one or more CPUs 1 in communication with main store (Computer Memory 2) as well as IO interfaces to storage devices 11 and networks 10 for communicating with other computers or SANs and the like. The CPU 1 is compliant with an architecture having an architected instruction set and architected functionality. The CPU 1 may have Dynamic Address Translation (DAT) 3 for transforming program addresses (virtual addresses) into real address of memory. A DAT typically includes a Translation Lookaside Buffer (TLB) 7 for caching translations so that later accesses to the block of computer memory 2 do not require the delay of address translation. Typically a cache 9 is employed between Computer Memory 2 and the Processor 1. The cache 9 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 2 by an instruction fetch unit 4 via a cache 9. The instruction is decoded in an instruction decode unit 6 and dispatched (with other instructions in some embodiments) to instruction execution units 8. Typically several execution units 8 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2, a load store unit 5 typically handles the access under control of the instruction being executed. Instructions may be executed in hardware circuits or in internal microcode (firmware) or by a combination of both.

In FIG. 1B, an example of a prior art emulated Host Computer system 21 is provided that emulates a Host computer system 50 of a Host architecture. In the emulated Host Computer system 21, the Host processor (CPU) 1 is an emulated Host processor (or virtual Host processor) and comprises an emulation processor 27 having a different native instruction set architecture than that of the processor 1 of the Host Computer 50. The emulated Host Computer system 21 has memory 22 accessible to the emulation processor 27. In the example embodiment, the Memory 27 is partitioned into a Host Computer Memory 2 portion and an Emulation Routines 23 portion. The Host Computer Memory 2 is available to programs of the emulated Host Computer 21 according to Host Computer Architecture. The emulation Processor 27 executes native instructions of an architected instruction set of an architecture other than that of the emulated processor 1, the native instructions obtained from Emulation Routines memory 23, and may access a Host instruction for execution from a program in Host Computer Memory 2 by employing one or more instruction (s) obtained in a Sequence & Access/Decode routine which may decode the Host instruction(s) accessed to determine a native instruction execution routine for emulating the function of the Host instruction accessed. Other facilities that are defined for the Host Computer System 50 architecture may be emulated by Architected Facilities Routines, including such facilities as General Purpose Registers, Control Registers, Dynamic Address Translation and I/O Subsystem support and processor cache for example. The Emulation Routines may also take advantage of function available in the emulation Processor 27 (such as general registers and dynamic translation of virtual addresses) to improve performance of the Emulation Routines. Special Hardware and Off-Load Engines may also be provided to assist the processor 27 in emulating the function of the Host Computer 50.

In a mainframe, architected machine instructions are used by programmers, usually today "C" programmers often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a Z/Architecture®, Linux can be used as well as machines which use emulation by Hercules, UMX, FSI (Fundamental Software, Inc) or Platform Solutions, Inc. (PSI), where generally execution is in an emulation mode. In emulation mode, emulation software is executed by a native processor to emulate the architecture of an emulated processor.

The native processor 27 typically executes emulation software 23 comprising either firmware or a native operating system to perform emulation of the emulated processor. The emulation software 23 is responsible for fetching and executing instructions of the emulated processor architecture. The emulation software 23 maintains an emulated program counter to keep track of instruction boundaries. The emulation software 23 may fetch one or more emulated machine instructions at a time and convert the one or more emulated machine instructions to a corresponding group of native machine instructions for execution by the native processor 27. These converted instructions may be cached such that a faster conversion can be accomplished. Not withstanding, the emulation software must maintain the architecture rules of the emulated processor architecture so as to assure operating systems and applications written for the emulated processor operate correctly. Furthermore the emulation software must provide resources identified by the emulated processor 1 architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine called to perform the function of the individual instruction. An emulation software function 23 emulating a function of an emulated processor 1 is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al, and U.S. Pat. No. 6,463,582: Dynamic optimizing object code translator for architecture emulation and dynamic optimizing object code translation method of Lethin et al; and U.S. Pat. No. 5,790,825 Method for emulating guest instructions on a host computer through dynamic recompilation of host instructions of Eric Traut; each of the above incorporated herein by reference in their entirety. These references illustrate a variety of known ways to achieve emulation of an instruction format architected for a different machine for a target machine available to those skilled in the art, as well as those commercial software techniques used by those referenced above.

SUMMARY

Shortcomings of the prior art are overcome and additional advantages are provided through the provision of a computer program product for blocking specific instructions from being executed by a logical processor executing in a virtual machine, the logical processor configured to run on a physical processor. The computer program product includes one or more computer readable storage media and program instructions collectively stored on the one or more computer readable storage media to perform a method. The method includes setting an instruction blocking value in the logical processor. The instruction blocking value is to block execution of instructions having certain function codes identified by the instruction blocking value. The instruction blocking value permits execution of an instruction having a permitted function code and blocks execution of an instruction having a not permitted function code. The logical processor fetches an instruction to be executed by the logical processor. The instruction specifies a function code of a plurality of function codes specifiable by the instruction, each function code specifying a function-to-be-performed. The plurality of function codes and the corresponding functions-to-be-performed are supported by the physical processor on which the logical processor is running. Based on the instruction blocking value and the function code of the fetched instruction, a determination is made as to whether the function-to-be-performed is a permitted function-to-be-performed, wherein the function-to-be-performed is determined to be a permitted instruction-to-be-performed based upon the instruction having a permitted function code and is determined not to be a permitted instruction-to-be-performed based upon the instruction having a not permitted function code. Execution of the fetched instruction is blocked based on determining that the function-to-be-performed is not a permitted function-to-be-performed. The blocking of execution includes causing a program exception event.

Computer-implemented methods and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter which is regarded as the invention is particularly pointed out and distinctly claimed in the claims at the conclusion of the specification. The foregoing and other objects, features, and advantages are apparent from the following detailed description taken in conjunction with the accompanying drawings in which:

FIG. 8 is a flow depicting an example Opcode Table;

FIG. 16 depicts one example of a Store Facility List Extended (STFLE) instruction;

FIG. 17 depicts one example of a Cipher Message (KM) instruction;

FIG. 18 depicts one example of function codes for a Cipher Message; and

DETAILED DESCRIPTION

Figure 1A:
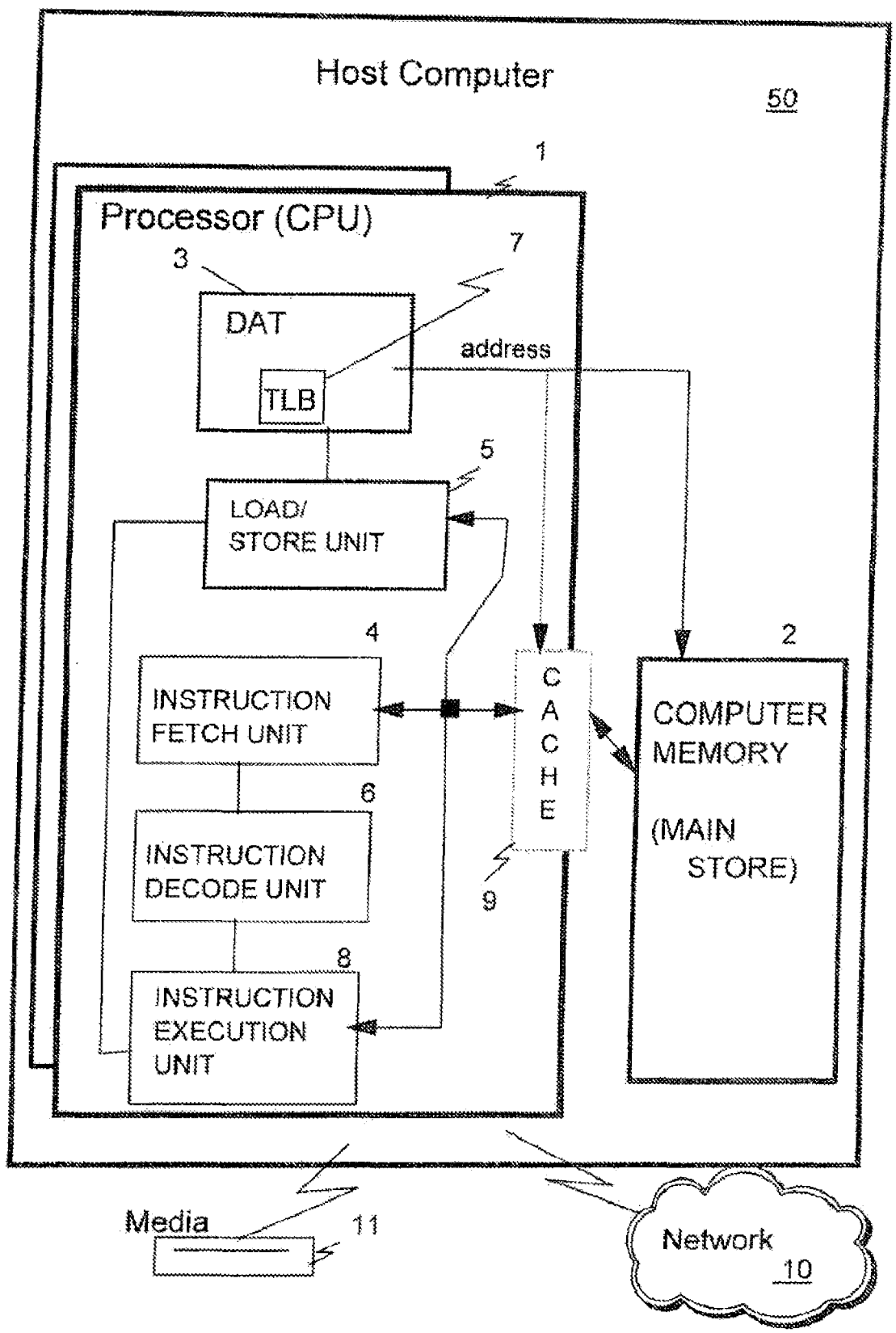
FIG. 1A is a diagram depicting an example Host computer system.
Figure 1B:
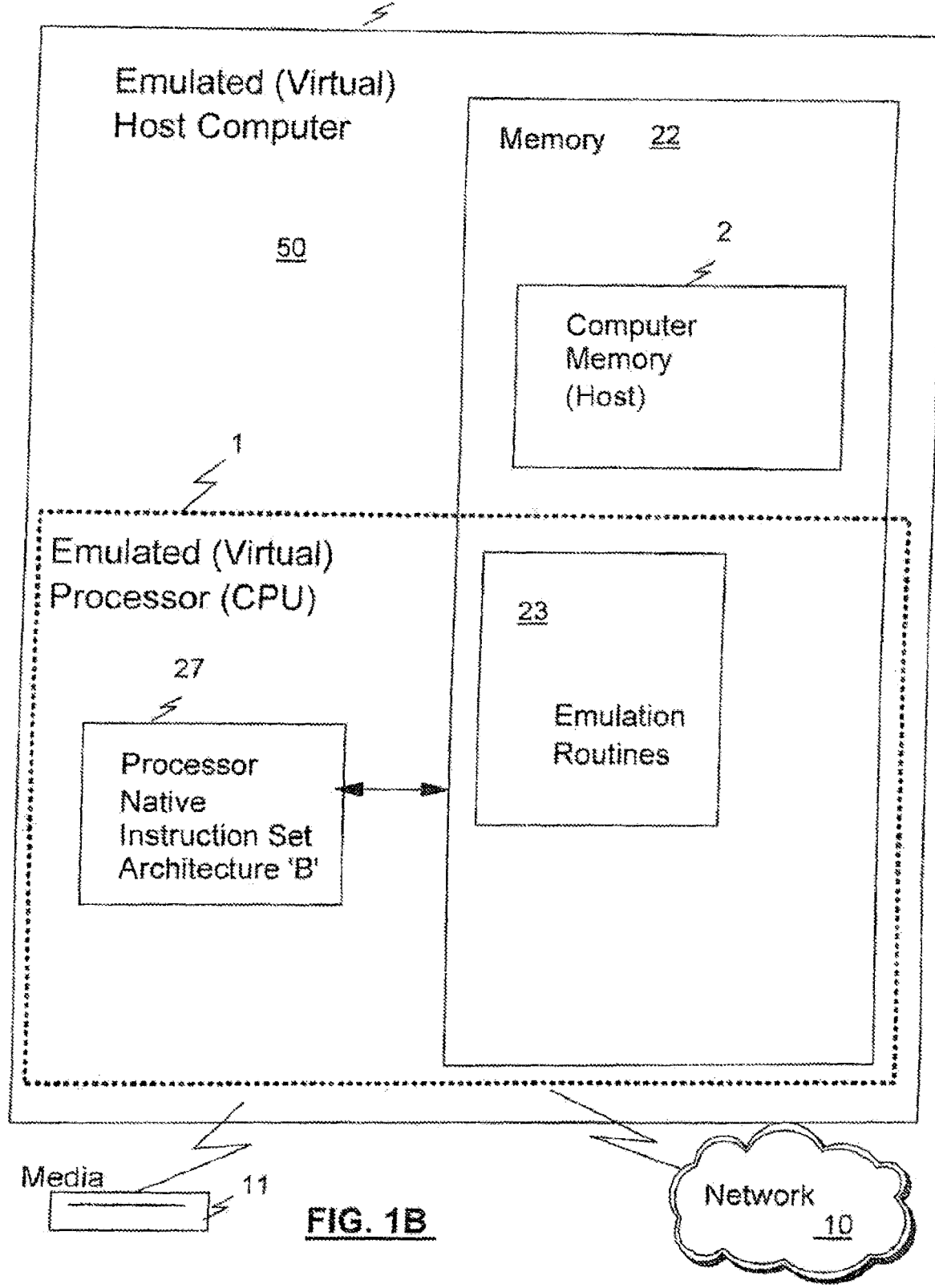
FIG. 1B is a diagram depicting an example emulation lost computer system.

An embodiment may be practiced by software (sometimes referred to Licensed Internal Code, Firmware, Micro-code, Milli-code, Pico-code and the like, any of which would be consistent with the teaching herein). Referring to FIG. 1A, a software program code embodiment is typically accessed by the processor also known as a CPU (Central Processing Unit) 1 of the system 50 from long-term storage media 11, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2 or storage of one computer system over a network 10 to other computer systems for use by users of such other systems.

Alternatively, the program code may be embodied in the memory 2, and accessed by the processor 1 using the processor bus. Such program code includes an operating system which controls the function and interaction of the various computer components and one or more application programs. Program code is normally paged from dense storage media 11 to high-speed memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 1C:
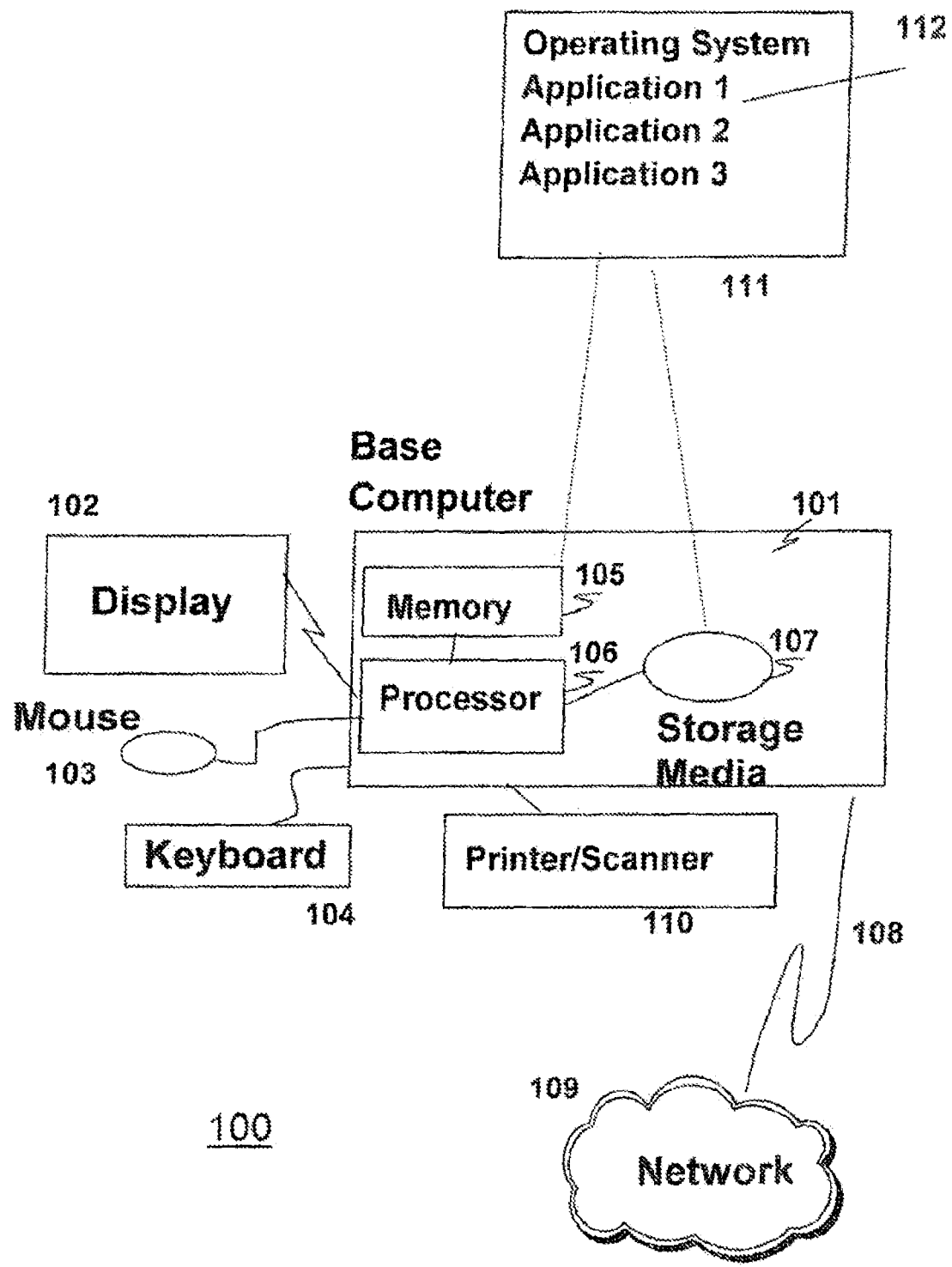
FIG. 1C is a diagram depicting an example computer system.

FIG. 1C illustrates a representative workstation or server hardware system in which embodiments may be practiced. The system 100 of FIG. 1C comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive (including any of magnetic media, CD, DVD and Flash Memory for example) or a tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating 108 with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
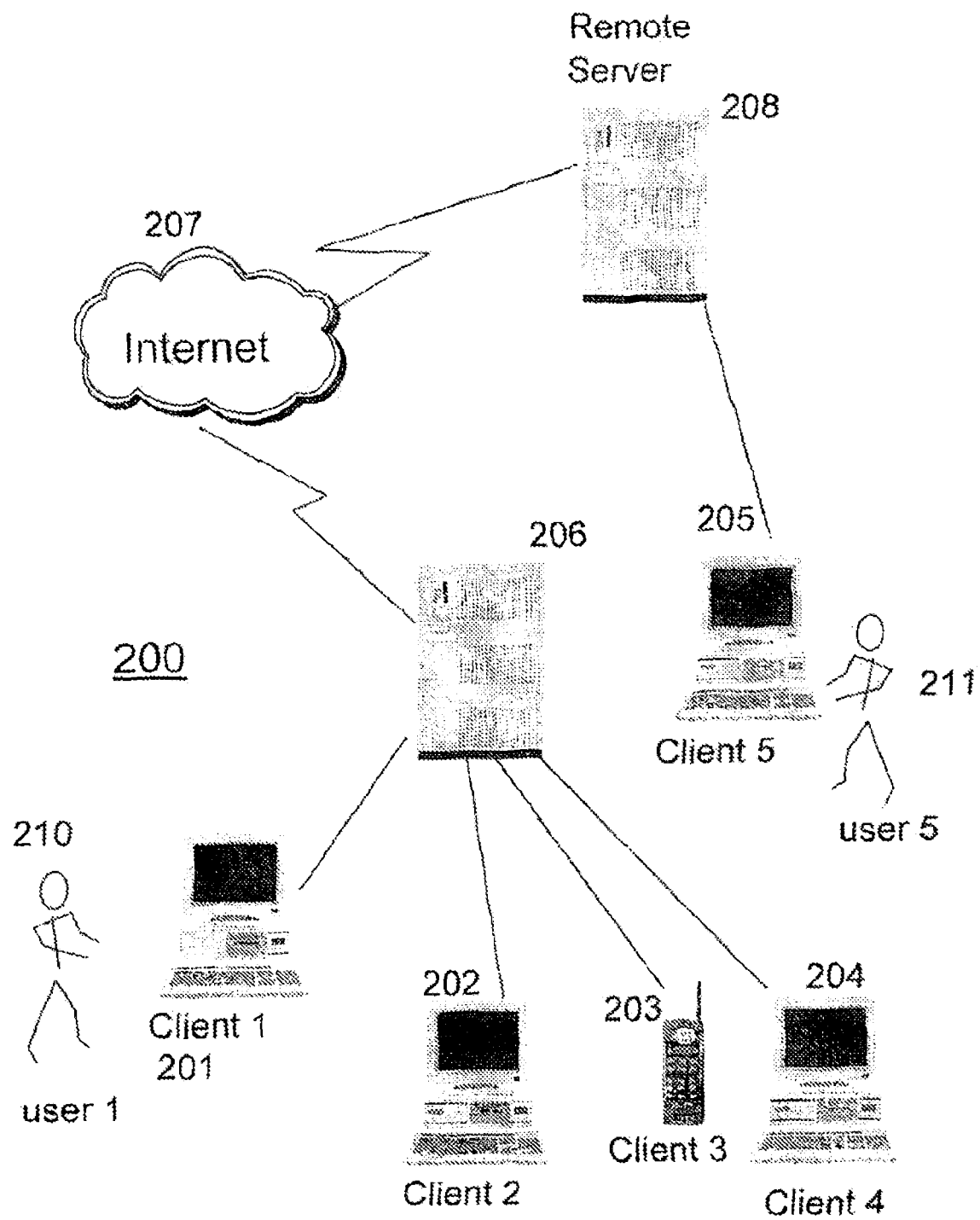
FIG. 2 is a diagram depicting an example computer network.

FIG. 2 illustrates a data processing network 200 in which an embodiment may be practiced. The data processing network 200 may include a plurality of individual networks, such as a wireless network and a wired network, each of which may include a plurality of individual workstations 101 201 202 203 204. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository and may also be accessed directly from a workstation 205). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 201 202 203 204 using a communications link. The gateway computer may be implemented utilizing an IBM eServer™ zSeries® z9® Server available from IBM Corp.

Software programming code is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high-speed memory 105 where it is available for processing by the processor 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 3:
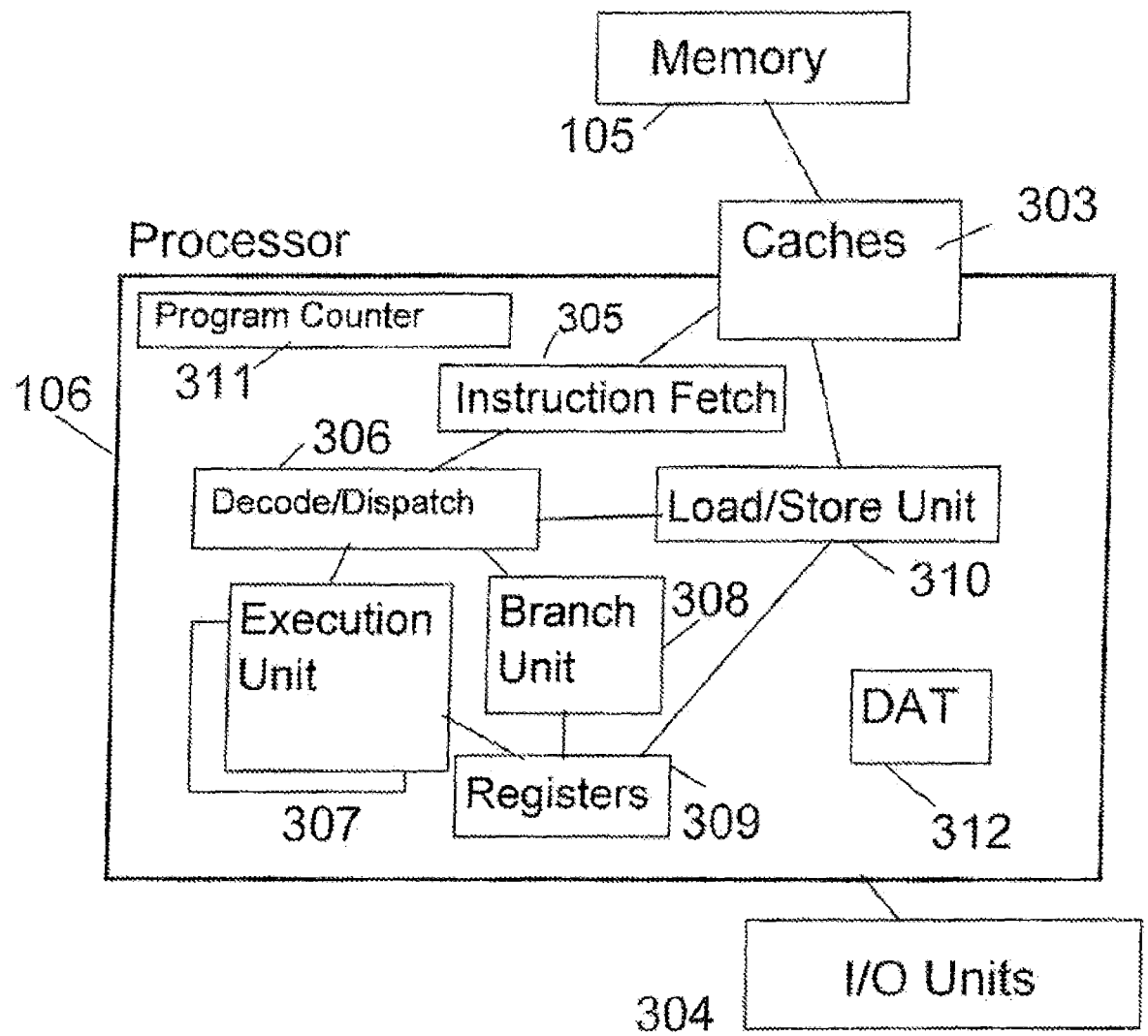
FIG. 3 is a diagram depicting example elements of a computer system.
Figure 4A:
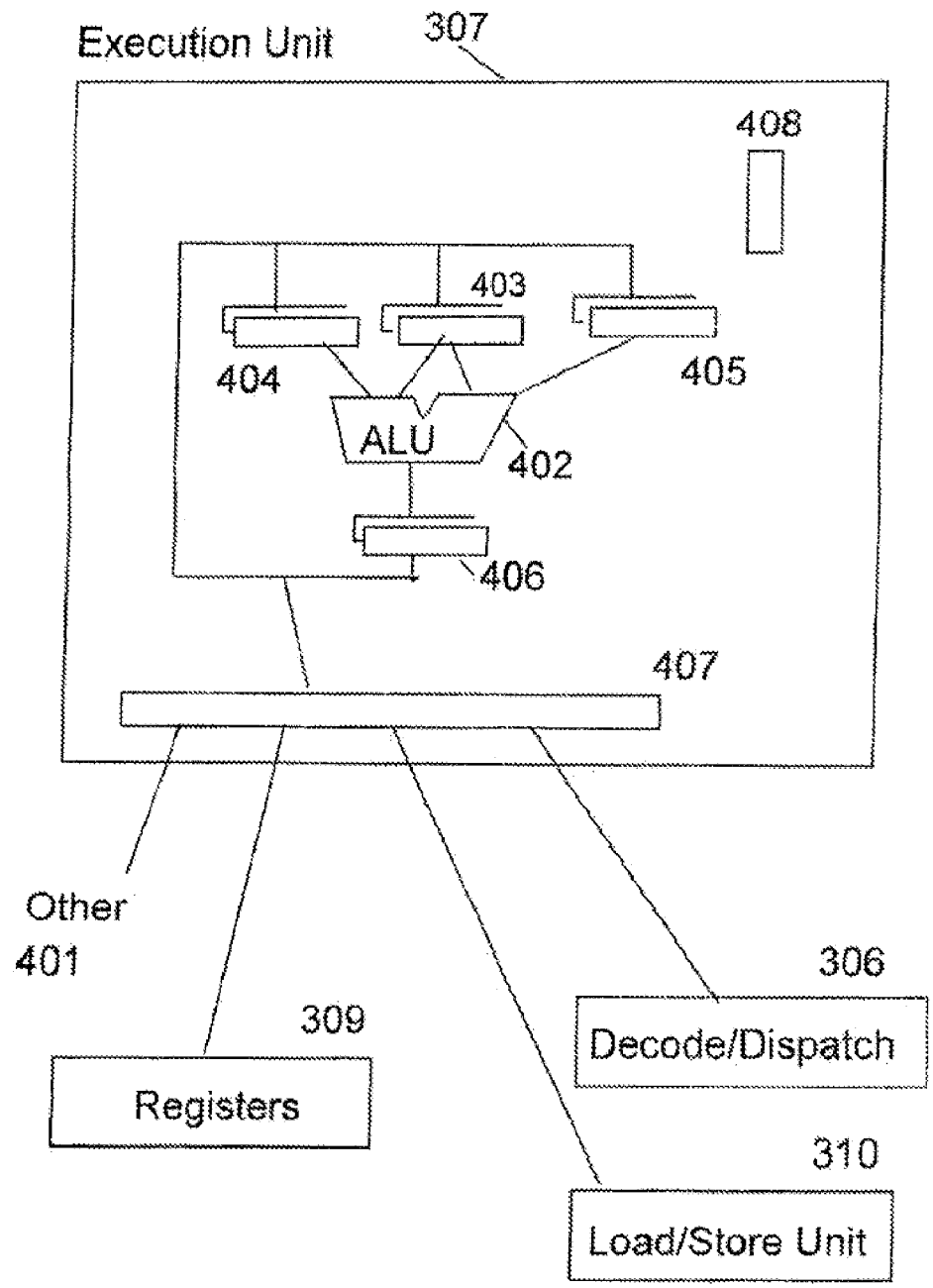
FIG. 4A is a diagram depicting an example execution unit.
Figure 4B:
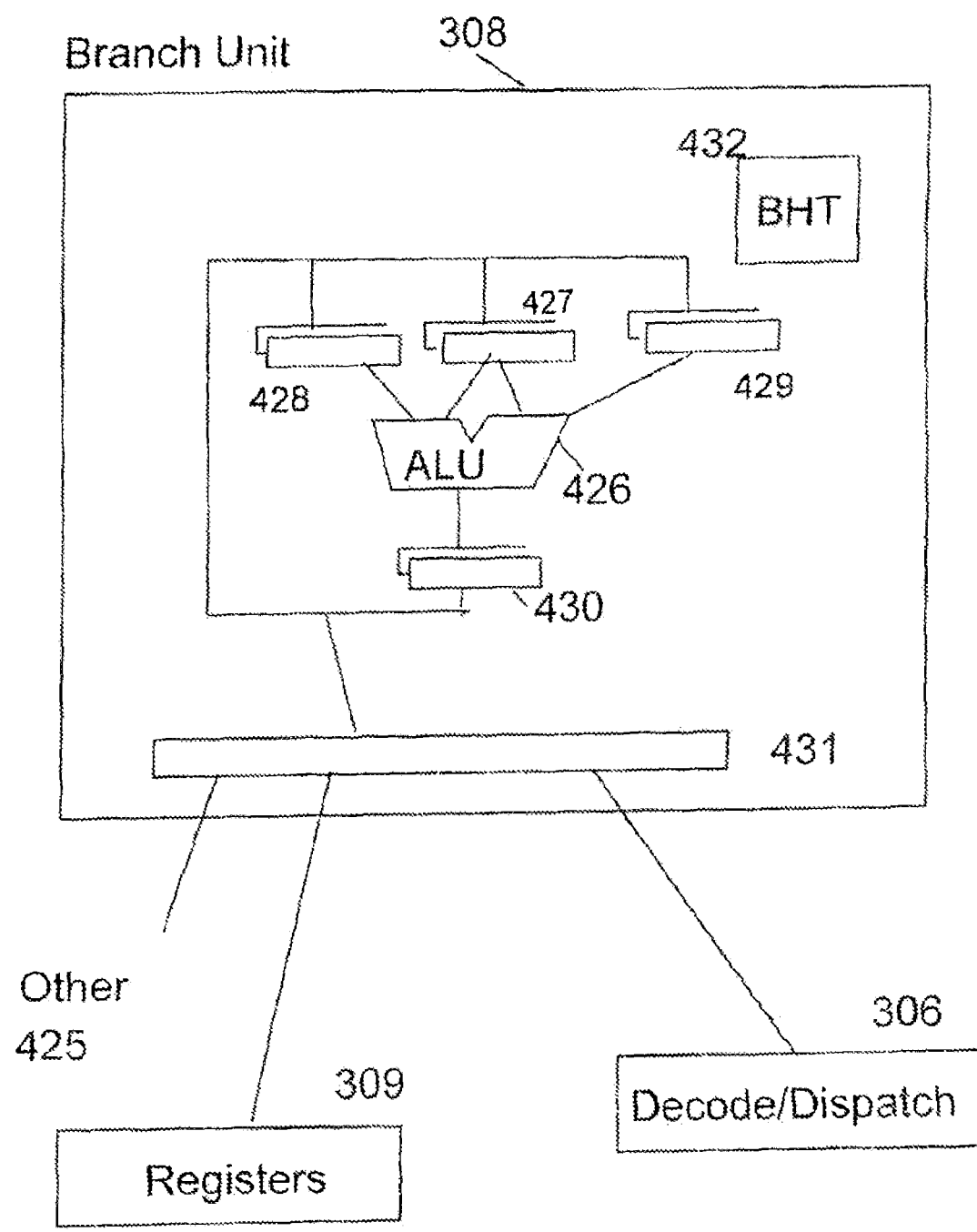
FIG. 4B is a diagram depicting an example branch unit.
Figure 4C:
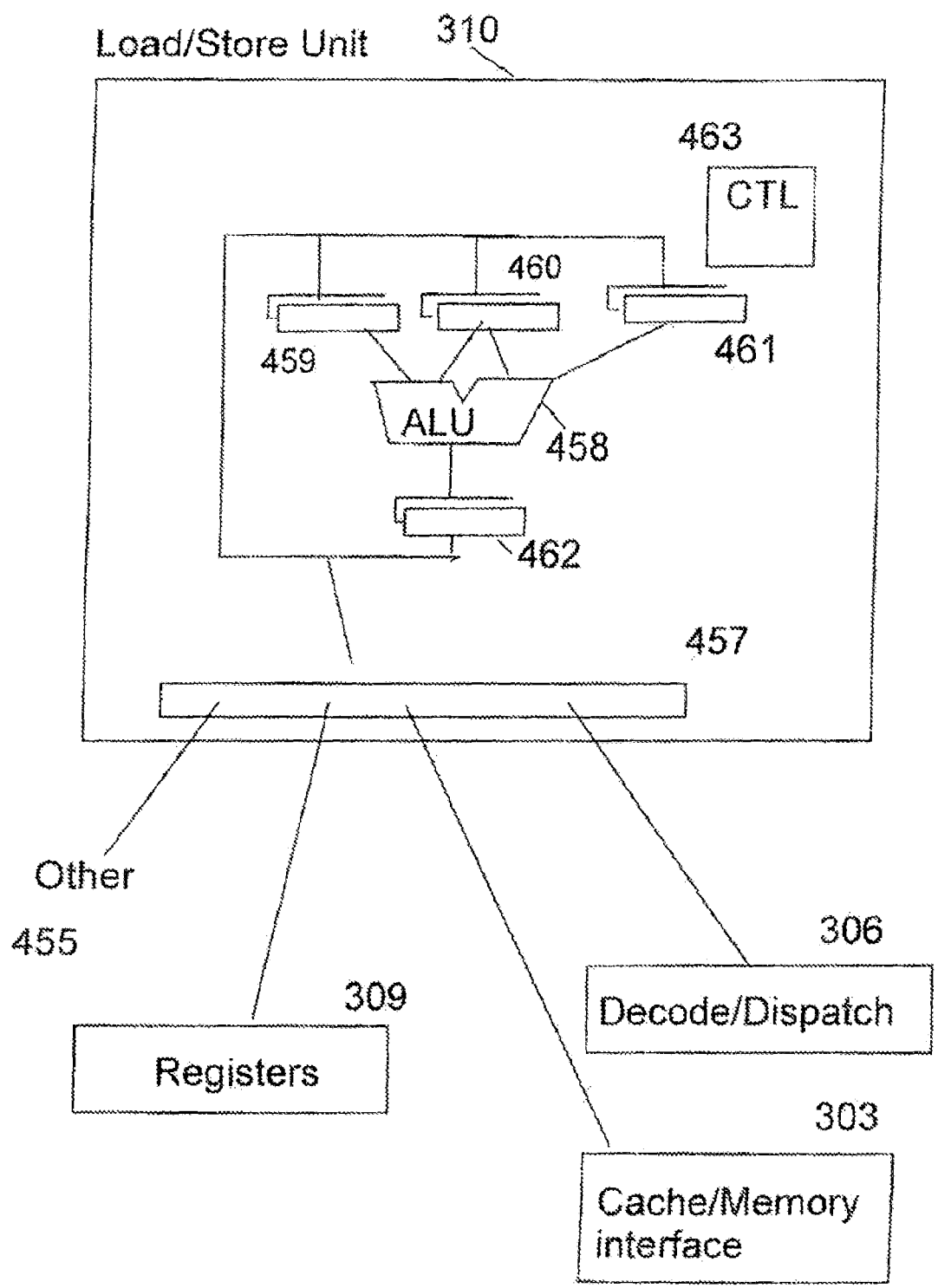
FIG. 4C is a diagram depicting an example Load/Store unit.

Referring to FIG. 3, an exemplary processor embodiment is depicted for processor 106. Typically one or more levels of Cache 303 are employed to buffer memory blocks in order to improve processor performance. The cache 303 is a high speed buffer holding cache lines of memory data that are likely to be used. Typical cache lines are 64, 128 or 256 bytes of memory data. Separate Caches are often employed for caching instructions than for caching data. Cache coherence (synchronization of copies of lines in Memory and the Caches) is often provided by various "Snoop" algorithms well known in the art. Main storage 105 of a processor system is often referred to as a cache. In a processor system having 4 levels of cache 303 main storage 105 is sometimes referred to as the level 5 (L5) cache since it is typically faster and only holds a portion of the non-volatile storage (DASD, Tape etc) that is available to a computer system. Main storage 105 "caches" pages of data paged in and out of the main storage 105 by the Operating system.

A program counter (instruction counter) 311 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the Operating system environment) The PSW of the program maintains the program counter value while the program is not active, and the program counter (in the PSW) of the operating system is used while the operating system is executing. Typically the Program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 311 is modified by either a context switch operation or a Branch taken operation of a Branch instruction for example. In a context switch operation, the current program counter value is saved in a Program Status Word (PSW) along with other state information about the program being executed (such as condition codes), and a new program counter value is loaded pointing to an instruction of a new program module to be executed. A branch taken operation is performed in order to permit the program to make decisions or loop within the program by loading the result of the Branch Instruction into the Program Counter 311.

Typically an instruction Fetch Unit 305 is employed to fetch instructions on behalf of the processor 106. The fetch unit either fetches "next sequential instructions", target instructions of Branch Taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 106. In an embodiment, the fetched instruction(s) are passed to a dispatch unit 306 of the fetch unit. The dispatch unit decodes the instruction(s) and forwards information about the decoded instruction(s) to appropriate units 307 308 310. An execution unit 307 will typically receive information about decoded arithmetic instructions from the instruction fetch unit 305 and will perform arithmetic operations on operands according to the opcode of the instruction. Operands are provided to the execution unit 307 preferably either from memory 105, architected registers 309 or from an immediate field of the instruction being executed. Results of the execution, when stored, are stored either in memory 105, registers 309 or in other machine hardware (such as control registers, PSW registers and the like).

Figure 5:
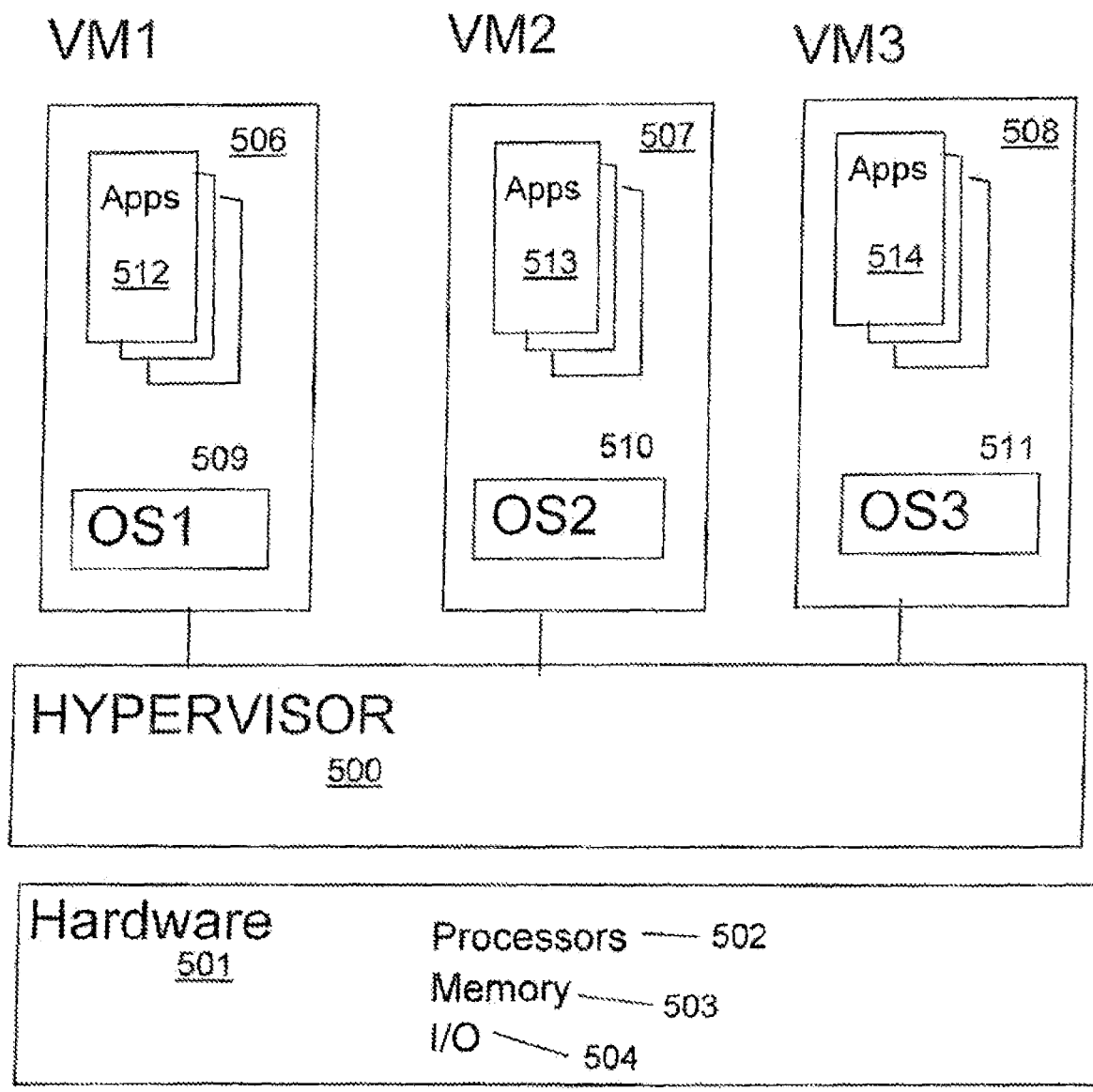
FIG. 5 is a diagram depicting an example logical portioning.

Referring to FIG. 5, an example Virtual Machine (VM) environment is shown. A Hypervisor 500 program (which may itself be an Operating System (OS) such as zVM from IBM), may be running on multi-processor "Hardware" computer system 501 comprising a plurality of physical processors 502, a physical main memory 503 and physical adapters for communicating with IO peripheral devices 504 including storage, networks, displays and the like. The Fypervisor 500 creates VM images (VM1 506, VM2 507 and VM3 508 for example) such that software including an OS 509 510 511 and Application Programs 512 513 514 can run within the virtual machine 506 507 508 utilizing virtual resources. The software running in a VM is unaware that it is running in a VM, and operates using the virtual resources as if they were physical resources. The zVM operating system from IBM can create "Guest" images, each guest image is effectively a virtual machine. Furthermore, any zVM guest may itself run a zVM OS creating "second level Guests". Thus, a virtual machine (guest image) 508 could be nested in a hierarchy of virtual machines, each zVM playing a hypervisor role for its Guest images. On the other hand, a multi-processor platform may be "physically partitioned", each physical partition may be assigned resources (processors, memory, I/O). Each physical partition is a VM since the software running in the partition, is not aware of resources of the machine not assigned to the partition. Thus the resources of the machine are "virtualized". In another embodiment, logical partitions are VMs.

The terms Guests, Virtual Machines (VMs) and Logical partitions may be use interchangeably herein as there are many methods known in the art for virtualizing a computer system image.

Virtualization is depicted for example in a white paper from VMware® titled "Virtualization Overview" and "VMware VMotion and CPU Compatibility" VMware® Infrastructure 3 from VMware® incorporated herein by reference. Furthermore US Patent Application Publication No. 2009/0070760 "VIRTUAL MACHINE (VM) MIGRATION BETWEEN PROCESSOR ARCHITECTURES" by Khatri et al. filed Sep. 6, 2007 and incorporated herein by reference discusses emulating certain feature set to enable a VM migration amongst similar pools of machines by masking selected bits of a CPUID register.

Figure 6:
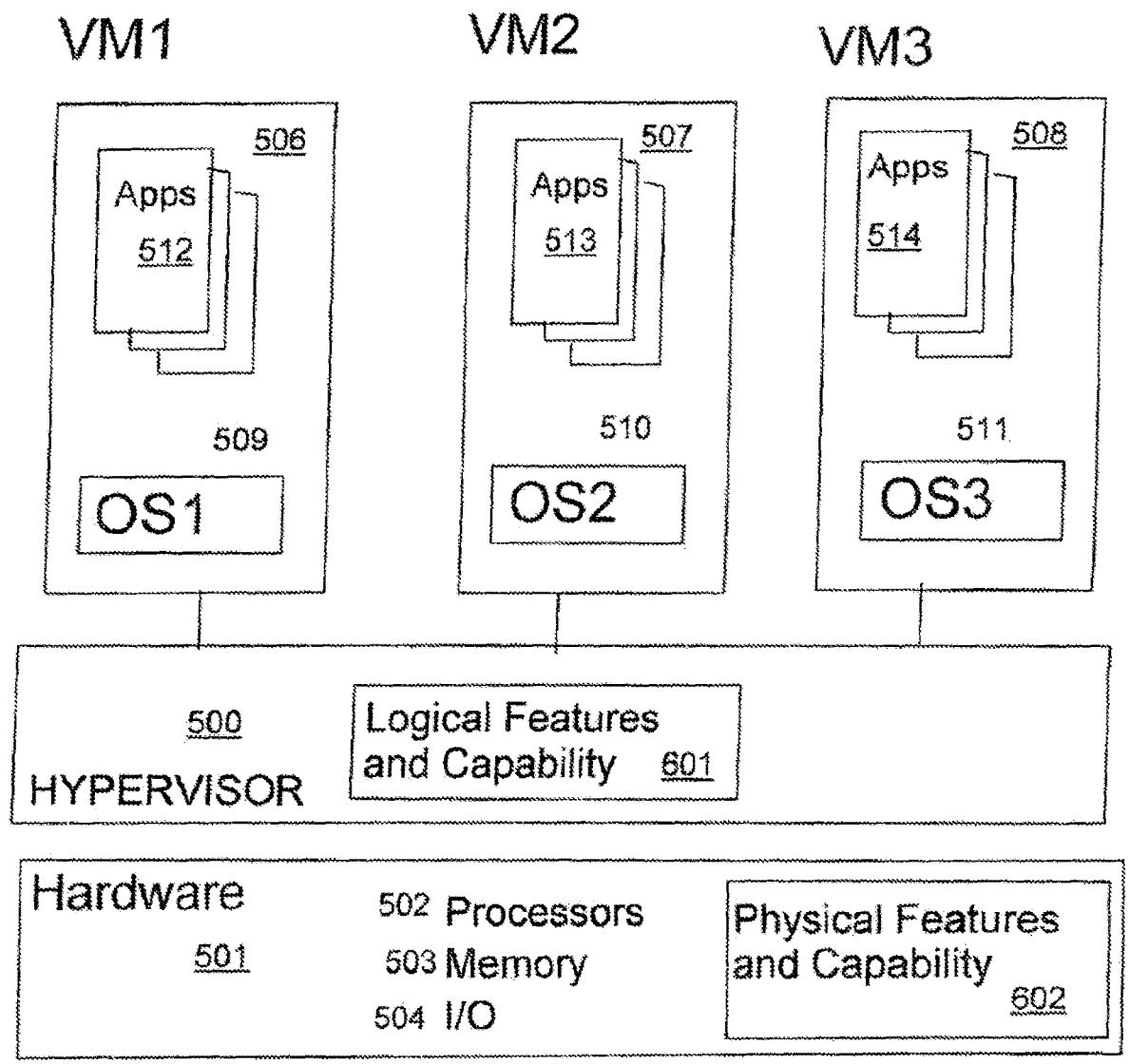
FIG. 6 is a diagram depicting example logical partitioning elements.

Referring to FIG. 6, each VM 506 507 508 may have a different OS and different applications. For example, OS1 509 may be z/OS from IBM and OS2 510 may be zLinux from IBM, or all OSs may be the same OSs such as z/OSs.

The Hypervisor 500 creates Logical Features 601, resources 601 and capabilities for each VM based on physical features 602, resources 602 and capabilities 602. In an example system, Physical Memory 503 portions may be allotted to each VM 506 507 508 by way of Dynamic Address Translation, physical processors 502 may be time-shared amongst VMs as may be I/O capability 504.

Figure 7:
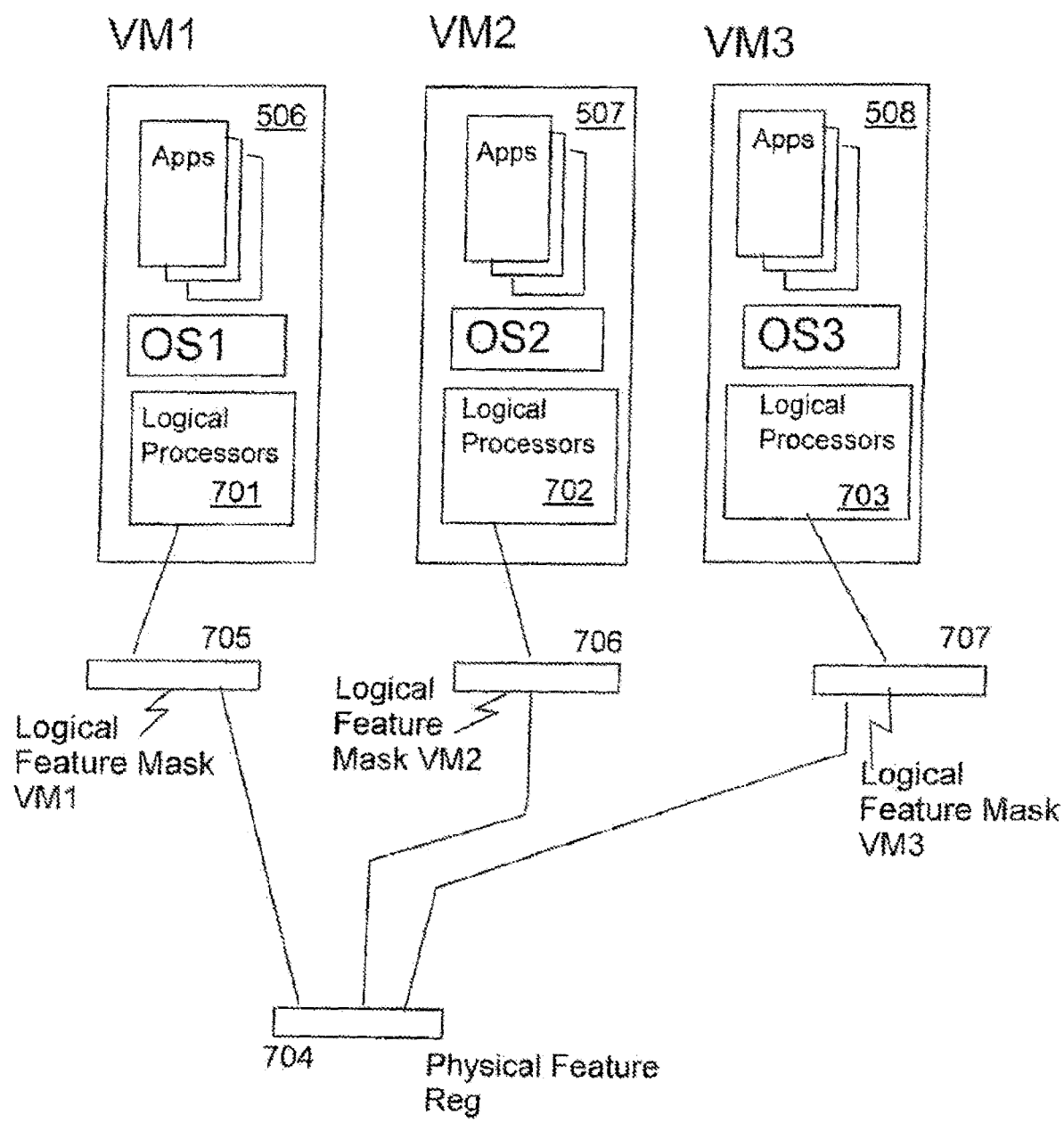
FIG. 7 is a diagram depicting example logical partitioning elements.

Referring to FIG. 7, each logical processor 701 702 703 may have access to physical feature registers 704 by way of a Hypervisor managed Logical Feature Mask 705 706 707. Thus, software running on logical processors can give the appearance of operating on a common processor Architecture level, even if the actual processors are at different Architecture levels. In an example, the Physical Feature register 704 might be an Intel CPUID register that indicates the architecture level of the Intel processor as well as specific features that are available to the programmer. The Logical feature mask 705 706 707 is programmed to provide all or a subset of the physical processors CPUID to the software in a Virtual Machine (VM) when the VM queries the CPUID of the corresponding Logical processor.

The x86 processor architecture from Intel®, "Intel® Itanium® Architecture Software Developer's Manual, Volume 2, Revision 2.2 January 2006" incorporated by references, provides CPUID registers to identify features supported by a processor. The CPUID registers are unprivileged and accessed using the indirect mov (from) instruction. All registers beyond register CPUID number are reserved and raise a Reserved Register/Field fault if they are accessed. Writes are not permitted and no instruction exists for such an operation. Vendor information is located in CPUID registers 0 and 1 and specify a vendor name, in ASCII, for the processor implementation. All bytes after the end of the string up to the 16th byte are zero. Earlier ASCII characters are placed in lower number registers and lower numbered byte positions CPUID register 4 provides general application-level information about processor features. It contains a set of flag bits used to indicate if a given feature is supported in the processor model. When a bit is one the feature is supported; when 0 the feature is not supported. As new features are added (or removed) from future processor models the presence (or removal) of new features will be indicated by new feature bits. CPUID register 4 is logically split into two halves, both of which contain general feature and capability information but which have different usage models and access capabilities; this information reflects the status of any enabled or disabled features Both the upper and lower halves of CPUID register 4 are accessible through the move indirect register instruction; depending on the implementation, the latency for this access can be long and this access method is not appropriate for low-latency code versioning using self-selection. In addition, the upper half of CPUID register 4 is also accessible using the test feature instruction; the latency for this access is comparable to that of the test bit instruction and this access method enables low-latency code versioning using self selection.

The z/Architecture Principles of Operation provides a Store Facility List Extended (STFLE) instruction that like the Intel CPUID register provides the software with the knowledge of the features (or architecture levels) of the underlying Central Processing Units (CPU's) or processors. The STFLE instruction has the format shown in FIG. 16.

The STFLE instruction (FIG. 16) comprises an Opcode field bits (0-15), a register field B2 (16-19) and a displacement (immediate) field D2 (20-31). The execution of the STFLE instruction by a machine, stores a list of bits providing information about facilities in a program memory location determined by adding the contents of the register specified by the B2 field of the instruction to the 12 bit D2 immediate field, the memory location beginning at the doubleword (8 bytes, a word is 4 bytes) specified by the second operand address ((B2)+D2). The address of the program memory location in the zArchitecture is subject to Dynamic Address Translation (DAT).

Reserved bits are bits that are not currently assigned to represent a facility. For the leftmost doublewords in which facility bits are assigned, the reserved bits are stored as zeros. Doublewords to the right of the doubleword in which the highest-numbered facility bit is assigned for a model may or may not be stored Access exceptions and PER events are not recognized for doublewords that are not stored. The size of the second operand, in doublewords, is one more than the value specified in bits 56-63 of general register 0. The remaining bits of general register 0 are unassigned and should contain zeros; otherwise, the program may not operate compatibly in the future.

When the size of the second operand is large enough to contain all of the facility bits assigned for a model, then the complete facility list is stored in the second operand location, bits 56-63 of general register 0 are updated to contain one less than the number of doublewords needed to contain all of the facility bits assigned for the model, and condition code 0 is set.

When the size of the second operand is not large enough to contain all of the facility bits assigned for a model, then only the number of doublewords specified by the second-operand size are stored, bits 56-63 of general register 0 are updated to contain one less than the number of doublewords needed to contain all of the facility bits assigned for the model, and condition code 3 is set.

Execution of the instruction results in setting of a Condition Code value, the Condition Code value is saved during context switching in the Program Status Word (PSW).

Special Conditions

The second operand must be designated on a doubleword boundary; otherwise, a specification exception is recognized.

Resulting Condition Code
0 Complete facility list stored
1—
2—
3 Incomplete facility list stored
Program Exceptions:
Access (store, second operand)
Operation (if the store-facility-list-extended facility is not installed)
Specification
Programming Notes:
1. The performance of STORE FACILITY LIST EXTENDED may be significantly slower than that of simply testing a byte in storage. Programs that need to frequently test for the presence of a facility—for example, dual-path code in which the facility is used in one path but not another—should execute the STORE FACILITY LIST EXTENDED instruction once during initialization. Subsequently, the program may test for the presence of the facility by examining the stored result, using an instruction such as TEST UNDER MASK.

2. When condition code 0 is set, bits 56-63 of general register 0 are updated to indicate the number of doublewords stored. If the program chooses to ignore the results in general register 0, then it should ensure that the entire second operand in storage is set to zero prior to executing STORE FACILITY LIST EXTENDED.

TABLE 2 (below) shows prior art z/Architecture assigned STFLE bits and their meaning. A bit is set to one regardless of the current architectural mode if its meaning is true. A meaning applies to the current architectural mode unless it is said to apply to a specific architectural mode.

Unassigned bits are reserved for indication of new facilities; these bits may be stored as ones in the future.

The prior art z/Architecture facility list is defined as shown in Table 2 below

TABLE 2

Bit Meaning-When-Bit-Is-One:

0 The instructions marked "N3" in the instruction summary figures in Chapters 7 and 10 of z/Architecture are installed.
1 The z/Architecture architectural mode is installed.
2 The z/Architecture architectural mode is active. When this bit is zero, the ESA/390 architectural mode is active.
3 The DAT-enhancement facility is installed in the z/Architecture architectural mode. The DAT enhancement facility includes the INVALIDATE DAT TABLE ENTRY (IDTE) and COMPARE AND SWAP AND PURGE (CSPG) instructions
4 INVALIDATE DAT TABLE ENTRY (IDTE) performs the invalidation-and-clearing operation by selectively clearing combined region-and-segment table entries when a segment-table entry or entries are invalidated. IDTE also performs the clearing-by-ASCE operation. Unless bit 4 is one, IDTE simply purges all TLBs. Bit 3 is one if bit 4 is one.
5 INVALIDATE DAT TABLE ENTRY (IDTE) performs the invalidation-and-clearing operation by selectively clearing combined region-and-segment table entries when a region-table entry or entries are invalidated. Bits 3 and 4 are ones if bit 5 is one.
6 The ASN-and-LX reuse facility is installed in the z/Architecture architectural mode.
7 The store-facility-list-extended facility is installed.
8 The enhanced-DAT facility is installed in the z/Architecture architectural mode
9 The sense-running-status facility is installed in the z/Architecture architectural mode.
10 The conditional-SSKE facility is installed in the z/Architecture architectural mode.
11 The configuration-topology facility is installed in the z/Architecture architectural mode.
16 The extended-translation facility 2 is installed.
17 The message-security assist is installed
18 The long-displacement facility is installed in the z/Architecture architectural mode.
19 The long-displacement facility has high performance. Bit 18 is one if bit 19 is one.
20 The HFP-multiply-and-addlsubtract facility is installed
21 The extended-immediate facility is installed in the z/Architecture architectural mode.
22 The extended-translation facility 3 is installed in the z/Architecture architectural mode.
23 The HFP-unnormalized-extension facility is installed in the z/Architecture architectural mode.
24 The ETF2-enhancement facility is installed.
25 The store-clock-fast facility is installed in the z/Architecture architectural mode.
26 The parsing-enhancement facility is installed in the z/Architecture architectural mode.
27 The move-with-optional-specifications facility is installed in the z/Architecture architectural mode.
28 The TOD-clock-steering facility is installed in the z/Architecture architectural mode.
30 The ETF3-enhancement facility is installed in the z/Architecture architectural mode.
31 The extract-CPU-time facility is installed in the z/Architecture architectural mode.
32 The compare-and-swap-and-store facility is installed in the z/Architecture architectural mode.
33 The compare-and-swap-and-store facility 2 is installed in the z/Architecture architectural mode.
34 The general-instructions-extension facility is installed in the z/Architecture architectural mode.
35 The execute-extensions facility is installed in the zArchitecture architectural mode.
39 Assigned to IBM internal use.
41 The floating-point-support-enhancement facilities (FPR-GR-transfer, FPS-sign-handling, and DFP rounding) are installed in the z/Architecture architectural mode.
42 The DFP (decimal-floating-point) facility is installed in the z/Architecture architectural mode.
43 The DFP (decimal-floating-point) facility has high performance. Bit 42 is one if bit 43 is one.
44 The PFPO instruction is installed in the z/Architecture architectural mode.

An instruction may perform a single function in an architecture or, in some cases, any of a plurality of selectable functions. The selectable functions defined for an instruction may be different from machine to machine. For example, a multi-function instruction, when introduced for the first time in an architected instruction set, may have only a few selectable functions. A later architected instruction set may introduce more selectable functions to the previously introduced multi-function instruction. In an embodiment, a VM can be assigned a subset of the physical processor's selectable function whereby an instruction, running on a logical processor of the VM may query a list of available functions of the logical processor and only the functions assigned to the VM are returned, even though the physical processor can perform more selectable functions. In one embodiment, this is accomplished through a Function-Indicating-Instruction Interception Facility (FIIIF) that enables a hypervisor to trap, or intercept, execution of this query function by a guest (virtual machine), in order to present the reduced list of available functions. In another embodiment, the hypervisor specifies, for example through a bit mask, the set of functions to be reported to the guest, and the query function of the multi-function instruction reports this list. Furthermore, in an embodiment an instruction, executing on the logical processor, will experience a program exception if it attempts to perform a selected selectable function.

An example of an instruction having selectable functions, is CIPHER MESSAGE instruction of the z/Architecture.

The CIPHER MESSAGE (KM) instruction can perform any of a plurality of cipher message functions. One of the functions provided by CIPHER MESSAGE is to query the processor for a bit significant list of cipher message functions supported by the processor.

The format of the CIPHER MESSAGE instruction (FIG. 17) is as follows, where R1 designates a first General Register, and R2 designate a second General Register. The execution of the CIPHER MESSAGE instruction (FIG. 17) is as follows.

A function specified by the function code in implied general register 0 is performed.

Bits 16-23 of the instruction are ignored.

Bit positions 57-63 of general register 0 contain the function code.

The currently assigned function codes for CIPHER MESSAGE and CIPHER MESSAGE WITH CHAINING, respectively (0-3 and 18-20) are shown in the FIG. 18. All other function codes are unassigned. For cipher functions, bit 56 is the modifier bit which specifies whether an encryption or a decryption operation is to be performed. The modifier bit is ignored for all other functions. All other bits of general register 0 are ignored.

Implied general register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address.

The query function provides the means of indicating the availability of the other functions. The contents of general registers specified by fields of the instruction (R1, R2), and R2+1 are ignored for the query function.

For all other functions, the second operand (specified by R2) is ciphered as specified by the function code using a cryptographic key in the parameter block, and the result is placed in the first-operand location.

Figure 19:
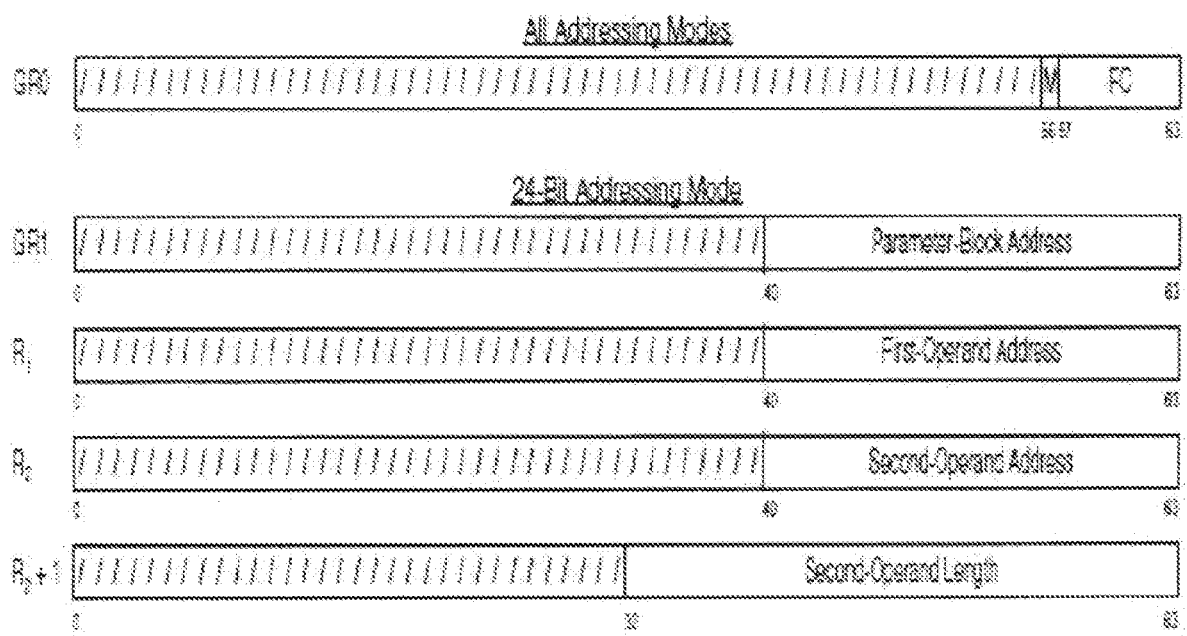
FIG. 19 depicts one example of register use for a Cipher Message.

For CIPHER MESSAGE WITH CHAINING, ciphering also uses an initial chaining value in the parameter block, and the chaining value is updated as part of the operation. Register use for 24 bit addressing is shown in FIG. 19.

The R1 field designates a general register and must designate an even-numbered register; otherwise, a specification exception is recognized.

The R2 field designates an even-odd pair of general registers and must designate an even-numbered register; otherwise, a specification exception is recognized.

The location of the leftmost byte of the first and second operands is specified by the contents of the R1 and R2 general registers, respectively. The number of bytes in the second-operand location is specified in general register R2+1. The first operand is the same length as the second operand.

As part of the operation, the addresses in general registers R1 and R2 are incremented by the number of bytes processed, and the length in general register R2+1 is decremented by the same number. The formation and updating of the addresses and length is dependent on the addressing mode.

In the 24-bit addressing mode, the contents of bit positions 40-63 of general registers R1 and R2 constitute the addresses of the first and second operands, respectively, and the contents of bit positions 0-39 are ignored; bits 40-63 of the updated addresses replace the corresponding bits in general registers R1 and R2, carries out of bit position 40 of the updated address are ignored, and the contents of bit positions 32-39 of general registers R1 and R2 are set to zeros. In the 31-bit addressing mode, the contents of bit positions 33-63 of general registers R1 and R2 constitute the addresses of the first and second operands, respectively, and the contents of bit positions 0-32 are ignored; bits 33-63 of the updated addresses replace the corresponding bits in general registers R1 and R2, carries out of bit position 33 of the updated address are ignored, and the content of bit position 32 of general registers R1 and R2 is set to zero. In the 64-bit addressing mode, the contents of bit positions 0-63 of general registers R1 and R2 constitute the addresses of the first and second operands, respectively; bits 0-63 of the updated addresses replace the contents of general registers R1 and R2, and carries out of bit position 0 are ignored.

In both the 24-bit and the 31-bit addressing modes, the contents of bit positions 32-63 of general register R2+1 form a 32-bit unsigned binary integer which specifies the number of bytes in the first and second operands, and the contents of bit positions 0-31 are ignored; bits 32-63 of the updated value replace the corresponding bits in general register R2+1. In the 64-bit addressing mode, the contents of bit positions 0-63 of general register R2+1 form a 64-bit unsigned binary integer which specifies the number of bytes in the first and second operands; and the updated value replaces the contents of general register R2+1.

In the 24-bit or 31-bit addressing mode, the contents of bit positions 0-31 of general registers R1, R2, and R2+1, always remain unchanged. FIG. 19 depicts the contents of the general registers just described.

In the access-register mode, access registers 1, R1, and R2 specify the address spaces containing the parameter block, first, and second operands, respectively.

The result is obtained as if processing starts at the left end of both the first and second operands and proceeds to the right, block by block. The operation is ended when the number of bytes in the second operand as specified in general register R2+1 have been processed and placed at the first-operand location (called normal completion) or when a CPU-determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case.

The results in the first-operand location and the chaining-value field are unpredictable if any of the following situations occur:

The cryptographic-key field overlaps any portion of the first operand.

The chaining-value field overlaps any portion of the first operand or the second operand.

The first and second operands overlap destructively. Operands are said to overlap destructively when the first-operand location would be used as a source after data would have been moved into it, assuming processing to be performed from left to right and one byte at a time.

When the operation ends due to normal completion, condition code 0 is set and the resulting value in R2+1 is zero. When the operation ends due to partial completion, condition code 3 is set and the resulting value in R2+1 is nonzero.

When a storage-alteration PER event is recognized, fewer than 4K additional bytes are stored into the first-operand locations before the event is reported.

When the second-operand length is initially zero, the parameter block, first, and second operands are not accessed, general registers R1, R2, and R2+1 are not changed, and condition code 0 is set.

When the contents of the R1 and R2 fields are the same, the contents of the designated registers are incremented only by the number of bytes processed, not by twice the number of bytes processed.

As observed by other CPUs and channel programs, references to the parameter block and storage operands may be multiple-access references, accesses to these storage locations are not necessarily block-concurrent, and the sequence of these accesses or references is undefined.

In certain unusual situations, instruction execution may complete by setting condition code 3 without updating the registers and chaining value to reflect the last unit of the first and second operands processed. The size of the unit processed in this case depends on the situation and the model, but is limited such that the portion of the first and second operands which have been processed and not reported do not overlap in storage. In all cases, change bits are set and PER storage-alteration events are reported, when applicable, for all first-operand locations processed.

Access exceptions may be reported for a larger portion of an operand than is processed in a single execution of the instruction, however, access exceptions are not recognized for locations beyond the length of an operand nor for locations more than 4K bytes beyond the current location being processed.

Using the CIPHER MESSAGE instruction as an example, an example machine may implement CIPHER MESSAGE functions. In the example implementation, Host processors may implement all of the functions shown (function code 0-3 and 18-20). A host Operating System (OS) (or hypervisor) may create one or more virtual machines for Guest OSs. One Virtual machine might be defined for a previous level architecture, not having CIPHER MESSAGE instructions.

According to an embodiment, if an Instruction Blocking Facility were installed and CIPHER MESSAGE instructions were designated as Blocked instructions for a VM, the Virtual machine would not permit CIPHER MESSAGE instruction execution by programs running in the Virtual machine, even though the underlying Host machine supported CIPHER MESSAGE instructions. An attempt to execute a CIPHER MESSAGE instruction in the VM would result in a program check (program exception).

According to another embodiment, if a Function blocking facility were installed and only a subset of the CIPHER MESSAGE functions (Function Codes 0-3 for example) were permitted in a VM, the Virtual machine would permit CIPHER MESSAGE execution but would not permit CIPHER MESSAGE instruction execution of CIPHER MESSAGE instructions having a function code other than 0-3 by programs running in the Virtual machine, even though the underlying Host machine supported CIPHER MESSAGE instructions supporting the function codes (0-3 and 18-20). An attempt to execute a CIPHER MESSAGE instruction having function codes other than 0-3 such as any of 18-20) would result in a program check (program exception).

In another embodiment, if a Function test/query facility were installed and only a subset of the CIPHER MESSAGE functions (Function Codes 0-3 for example) were permitted in a VM, execution of a CIPHER MESSAGE query of the CIPHER MESSAGE functions would return only function codes 0-3, even though the underlying Host machine supported function codes 0-3 and 18-20.

Instruction Blocking Facility:

Referring to FIG. 8, the function of a Virtual Architecture Level (VAL) Instruction Blocking facility in a VM is shown. Each instruction to be executed in the VM (as shown in the Instructions 901 902 903 904 905 906 in Storage column), includes an opcode. In some implementations, the opcode is a single field in the instruction 901 902 903 904. In other implementations, opcodes may be distributed in more than one field of the instruction 905 (OpCode||OpCode) 906 (OpCode||OpCode). Preferably, circuits, microcode or a combination thereof, would determine, based on the opcode, whether the instruction to be executed was supported or not by the current Virtual machine. If it was not supported, a program interruption, for example, a program exception would be indicated and the instruction suppressed.

In an implementation, the opcode of the instruction to be executed would be used to index into an opcode table 907 to locate an entry associated with the opcode. The entry located, would include a code indicating the machine level (ML) supported by the opcode. In another implementation, each Virtual machine would have an opcode table and the entry in the table would indicate whether the opcode was supported by the Virtual machine.

Figure 9:
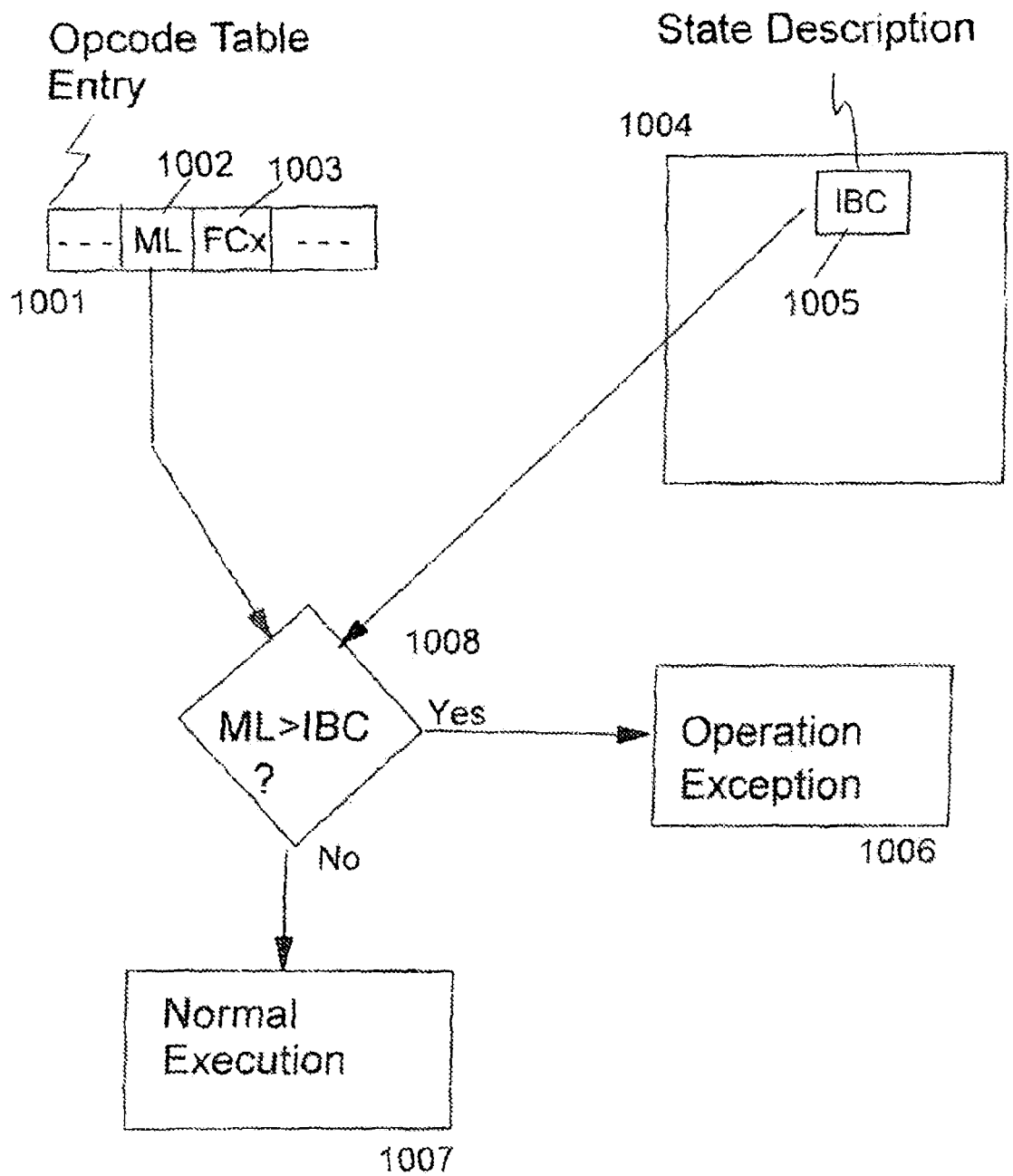
FIG. 9 is a flow depicting an example blocking technique.

Referring to FIG. 9, the code (machine level (ML)) 1002 obtained from the table 907 would be compared 1008 against a state description entry (IBC) 1005 of a state description table 1004 of the Virtual machine, and if the machine level code 1002 was equal to or less than the IBC state description entry 1008, the instruction would execute normally 1007, otherwise, the attempt to execute would result in a program exception 1006. In another embodiment, fields of the instruction in addition to, or other than the OpCode field may be used to index into the opcode table 907. For example, an opcode may have reserved fields (to be 0 or ignored) in a prior machine architecture, that are employed in newer architecture levels to provide new function. An embodiment would include these bits with the OpCode to index into the opcode table 907. In another embodiment the opcode table 907 may have fields in addition to the ML field used to indicate the permitted use of reserved bits in the associated instruction. For example, if the instruction has 4 reserve bits, the ML table may contain 0000 if all the bits must be 0, or 1's in selected bits where a 1 indicates that corresponding previously reserved bits of the field can be 0 or 1 (permitting the newly introduced function of the instruction for the VM)

Instruction Test/Query Facility:

If a FUNCTION BLOCKING FACILITY of the Instruction Test/Query facility is installed (FIG. 10), the Opcode table entry 1001 may, in an embodiment, additionally include a function code field (FCx) 1003 (or a pointer to a function code table 1108). The function code field 1003 (or the function code table 1108 entry 1107) is compared 1103 with the function code to be executed 1102. If the function code compares, the instruction is permitted 1105 to use the function code, if the function code doesn't compare 1103, the instruction execution causes a program interruption, such as a program exception or specification exception (program check) 1104.

Figure 11:
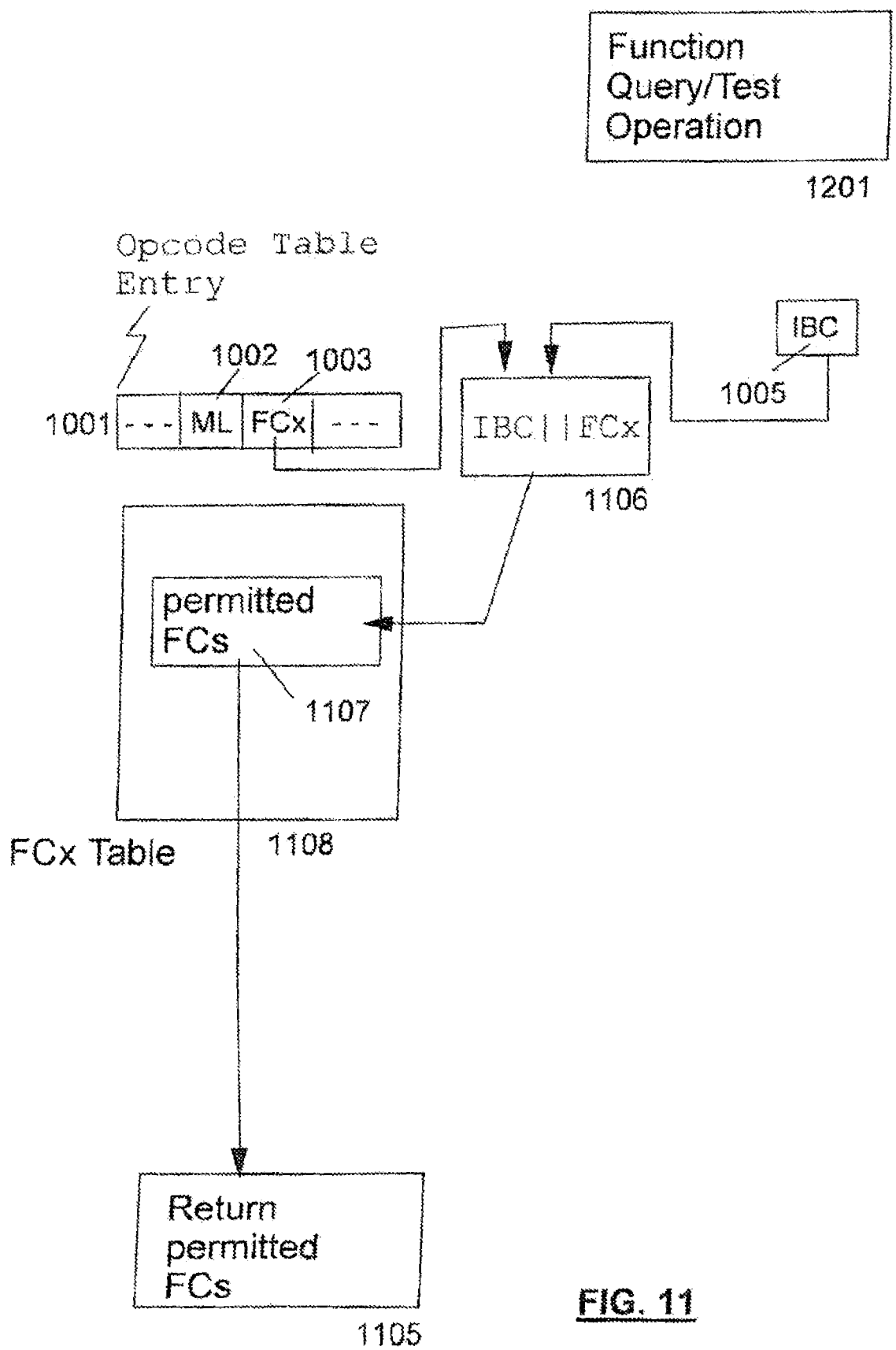
FIG. 11 is a flow depicting an example blocking technique.

Referring to FIG. 11, if a FUNCTION TEST/QUERY BLOCKING FACILITY of the Instruction Test/Query facility is installed, if any query instruction 1201 is executed to determine the installed function of the instruction, only the function codes permitted by the Virtual machine are returned 1205. In an embodiment, a bit significant table 1108 is provided for the Virtual machine that is used by the Virtual machine to respond to such queries. In another embodiment, a mask is provided (not shown) to the Virtual machine to be ANDed with the installed function codes of the Host machine to create a result of permitted function codes 1107 of the instruction in the VM.

Referring to FIG. 8, example z/Architecture instruction formats are shown. Format 901 depicts a 2 byte format wherein the OpCode (Op) occupies the high order byte, and general register fields R1 and R2 occupy respective 4 bits of the remaining byte. Format 902 depicts a 2 byte OpCode only instruction format. Format 903 depicts a 4 byte (word) instruction having a 1 byte OpCode (Op) followed by 3 register fields, (R1, X2 and B2) and then an immediate field called the Displacement field (D2). Format 904 depicts a 4 byte instruction having a 4 byte OpCode (Op), followed by a 4 bit register field (B2) and then a 12 bit Immediate field (I2). Format 905 depicts a 4 byte instruction having a 1 byte OpCode (Op) followed by a 4 bit mask M1, followed by a 4 bit OpCode extension (Op) and a reserved 4 bit field, followed by a 12 bit Immediate field (I2). Format 906 depicts a 6 byte instruction having a 1 byte OpCode (Op) followed by 3 register fields, (R1, X2 and B2) and then an immediate field called the Displacement field (DL2) followed by a 8 bit immediate field (DH2) and an 8 bit OpCode extension (Op).

Referring to FIGS. 8 and 9, in an embodiment, when an instruction is fetched for execution by a logical processor of a virtual machine, an Opcode Table 907 is searched, using the OpCode(s) of the instruction as a search argument. If an entry is found 1001 for the instruction, the entry includes information 1002 1003 for determining instruction permission information In a preferred embodiment, an entry includes a field 1002 that specifies a code (ML) indicating the machine level of the architecture supporting the instruction. A state description 1004 is provided for each VM. The state description includes a field (IBC) 1005 that represents the machine level of the architecture that the VM is to simulate. If 1005, the machine level of the architecture supporting the instruction (ML) is greater than the machine level of the architecture that the VM is to simulate (IBC), a program Exception (Program Check) is signaled, and in an embodiment, the execution of the instruction may be suppressed. On the other hand, if the machine level of the architecture supporting the instruction (ML) is not greater than the machine level of the architecture that the VM is to simulate (IBC), the instruction is permitted to execute.

In some environments instructions are provided that are able to execute any of a plurality of functions (such as the CIPHER MESSAGE instruction described supra). The selection of the function by an instruction may be by way of specifying a function code (FC) representing the function. The Function Code may be indirectly specified by the instruction or explicitly specified by bits or fields of the instruction for example. In some cases, certain function codes may be initially implemented (0-3 for example) in a machine architecture level, and additional function codes may be added at later machine architecture levels. The VM can be provided with the capability to only permit function codes to execute of an older architecture level, and block (prevent) execution of functions of a newer architecture level.

Figure 10:
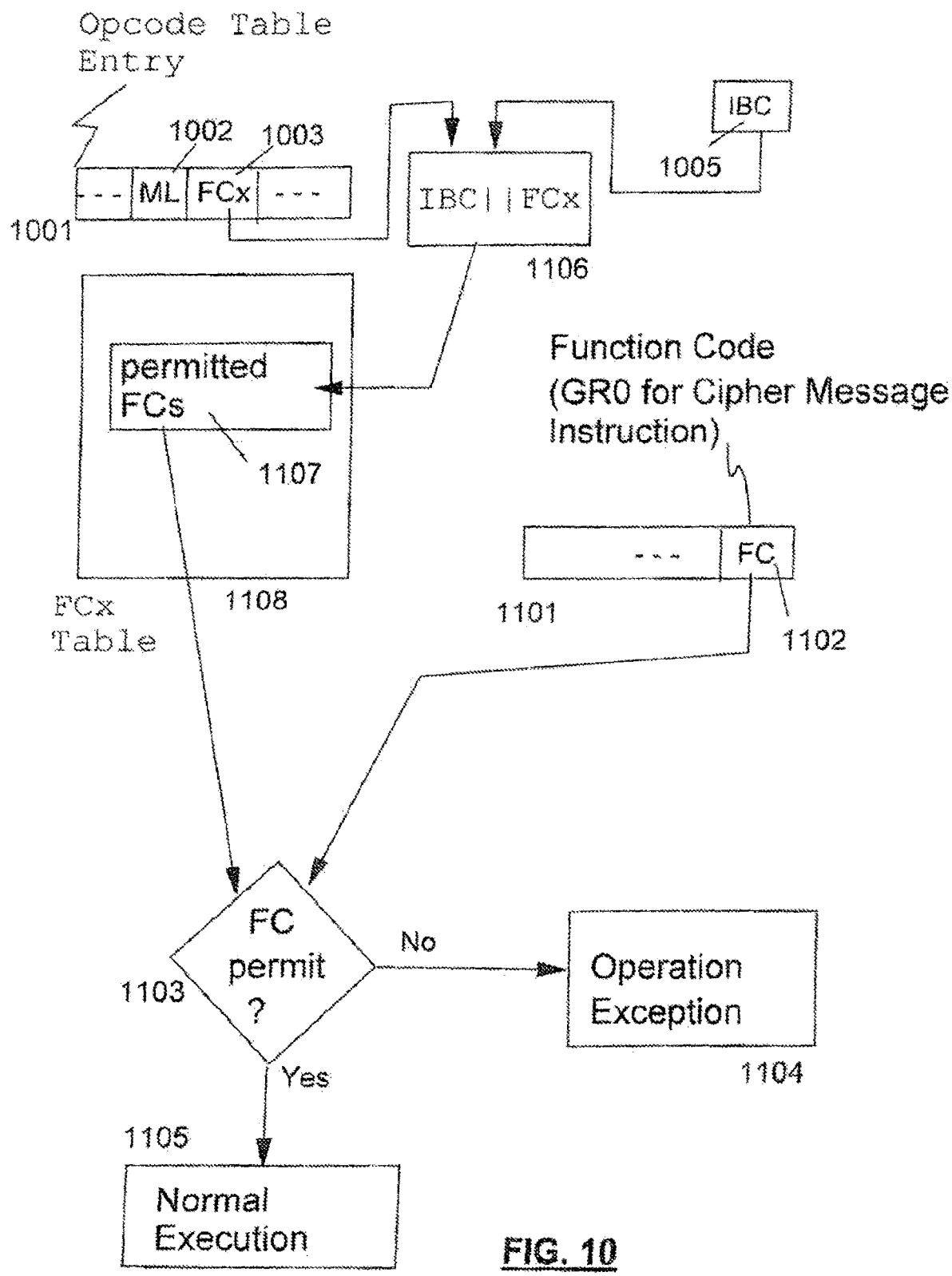
FIG. 10 is a flow depicting an example blocking technique.

Referring to FIG. 10, this may be accomplished by having a function code field (FCx) 1003 in the Opcode Table Entry 1001. When an instruction is about to be executed, the FCx field 1003 specifies the allowed function code list to be returned rather than the actual function codes supported by the Host processor. In an embodiment, the FCx 1003 field of the Opcode Table entry is concatenated with the IBC field 1005 to index 1006 into an FCx Table 1108 to locate an entry that comprises permitted function codes (FCs) 1107. The permitted FCs 1107 are compared with the FC specified by the instruction 1102 (in the Cipher Message instruction, bits 1102 of general register 0 1101 contain the specified FC 1102). If 1103 the FC value is permitted 1105, normal execution of the function represented by the FC bits is permitted. If 1103 the FC value is not permitted 1104, a program exception, such as a specification exception (program check) event is performed. Similarly, when executing a Function Query/test operation 1201 (such as the CIPHER MESSAGE instruction Query operation), the FCX bits of the Opcode Table Entry 1003 are concatenated 1106 with the IBC bits 1005 to index into the FCX table 1108 to locate the permitted FCs 1107 for the instruction whose OpCode locates the Opcode Table Entry 1001. The permitted FCs are then returned 1105 to the location specified by the Function Query/Test operation.

In an embodiment, when the FCX bits are 0, no FCx Table 1108 access is performed and any Function Code indicated by the corresponding instruction is used without translation.

In an embodiment, other architecture modifications to instructions can use the same mechanism as described for Function codes. In this case for example, instruction 905 at an architectural level has the bits between the OpCode extension field and the 12 field, reserved (0000). Preferably, the reserved bits are tested for 0's to make sure the instruction will perform properly in an environment where non-zero bits support not yet supported function A newer architecture implements a new function using one or more of the reserved bits to identify the new function. In an example, these 4 reserved bits (Res) may index into the FCx Table 1108 in order to determine if they are supported as shown for FC bits 1102 in FIG. 10. In this case, the concatenation would be 0||IBC||FCx for Function codes, and 1||IBC||FCx for the new function permission test 1103. Instead of the FC 1102 being compared with the permitted FCs 1107, the Res field of the instruction 905 would be checked against the permitted FCS bits 1107 to determine 1103 if the function is permitted.

In another embodiment, the Res field of the instruction 905 could be concatenated as if it were a third OpCode extension of 905 OpCodes to index into the Opcode Table 907 to determine if the function introduced with the field is permitted.

As a part of, or subsequent to, the fetching of an instruction, a CPU may determine certain attributes of the instruction, for example, number of operands, type of operands (storage or register), operand alignment requirements, and authorization requirements. In an emulation environment, this determination may be the result of a simple table look-up using the operation code as an index; in a high-performance CPU hardware implementation, the determination may be built into the instruction-decode circuitry of the processor Thus, as an instruction is being decoded, the machine level for that instruction may be compared with a programmable value that indicates the machine level permitted. An instruction being decoded having a higher machine level than the permitted value would be blocked from either being dispatched, executed or completed dependent on implementation and the machine dependent exception for invalid opcode may be generated.

The virtual-architecture-level facility may introduce an additional attribute associated with each instruction: the machine level at which the instruction was first introduced to the architecture. This machine level may be an encoded numeric point on a continuum (for example, 10.2, meaning the 10th-generation machine at the second firmware level), or it may simply be a value relative to the most-recent machine level (for example, 2 [or −2], meaning that the instruction was introduced two machine generations prior to the current machine).

Figure 12:
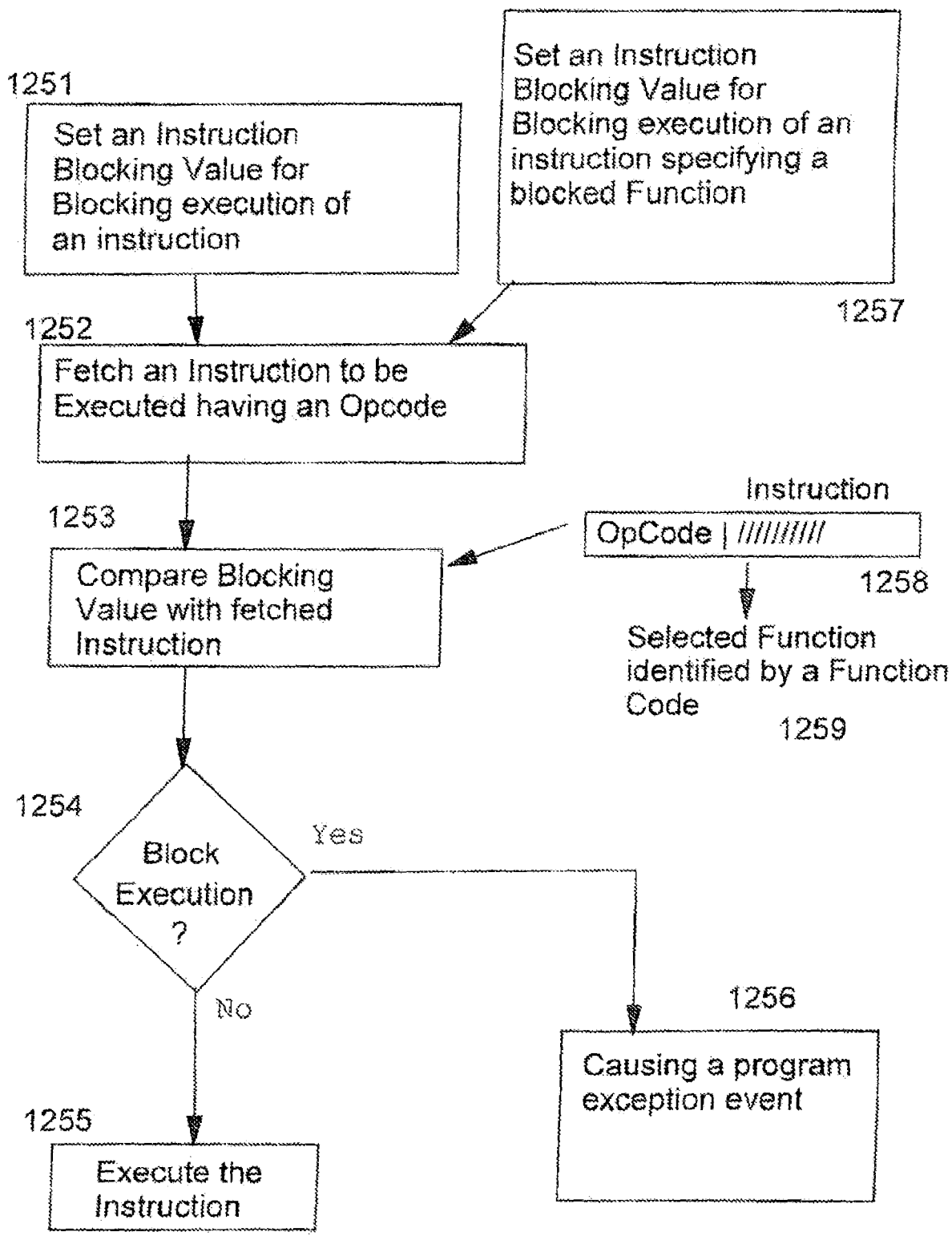
FIGS. 12-15 depict flows of instruction blocking techniques.

Referring to FIG. 12, in an embodiment, specific instructions 1258 are blocked from being executed by a processor. An instruction blocking value is set 1251. An instruction is fetched 1252 to be executed by the processor, the instruction comprising an opcode, the instruction supported by the processor. When the instruction is to be executed, a comparison of the instruction blocking value with the instruction (or the opcode of the instruction) is made to determine if the execution is permitted. Responsive 1254 to the instruction blocking value permitting execution of the instruction, executing 1255 the fetched instruction by the processor, and responsive 1254 to the instruction blocking value not permitting execution 1256 of the instruction, blocking execution of the fetched instruction and causing a program exception event.

Figure 13:
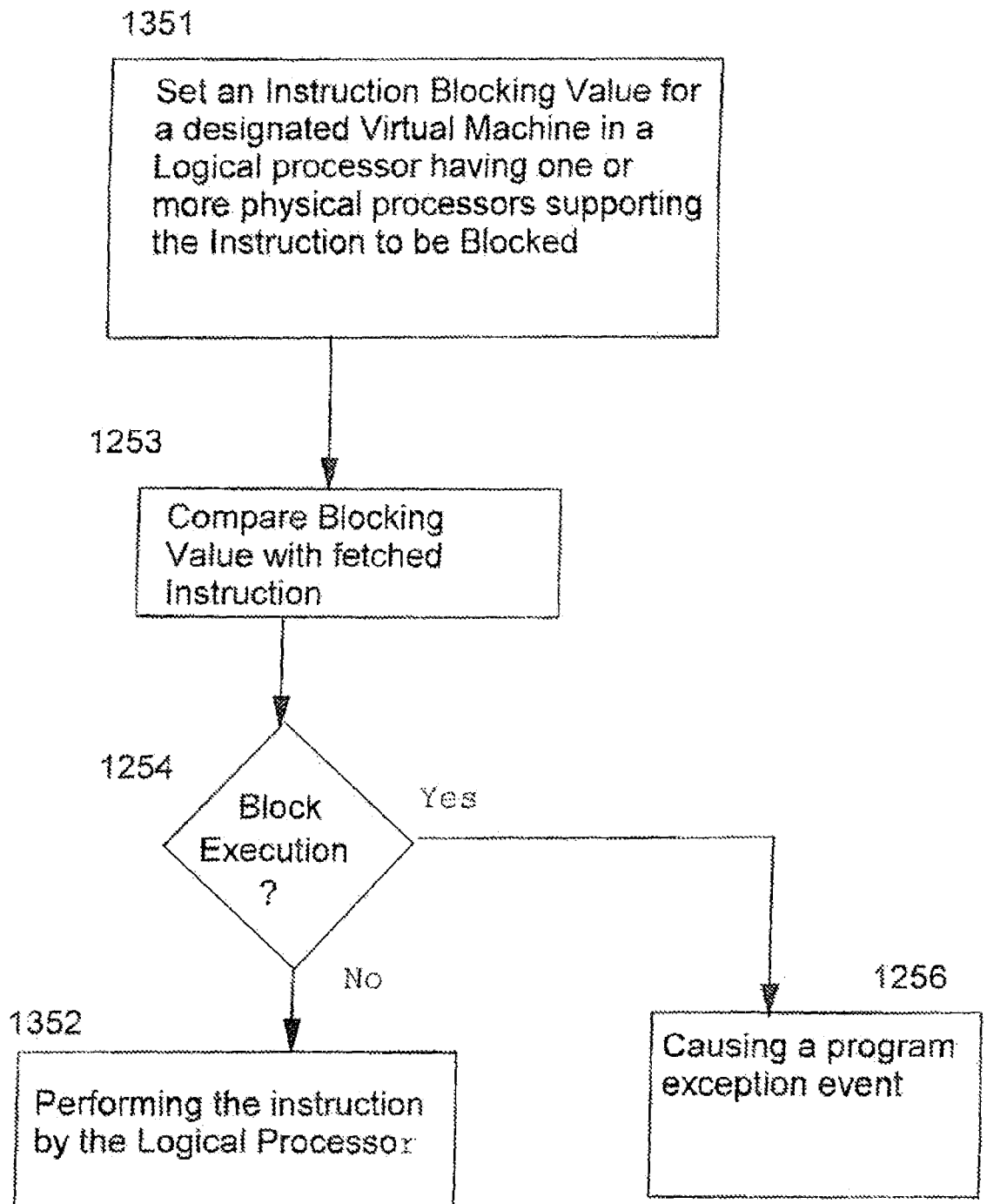

Referring to FIG. 13, in an embodiment, the processor is a logical processor of a virtual machine, wherein the fetching is performed by the logical processor. A determination 1254 of the instruction blocking value of the virtual machine is made, wherein the instruction blocking value is set in the logical processor having one or more physical processors, wherein the instruction is supported by the one or more physical processors, wherein responsive to the instruction blocking value permitting execution of the instruction, the execution is performed 1352 by the logical processor. If the instruction is blocked 1256 a program exception event is reported.

Figure 14:
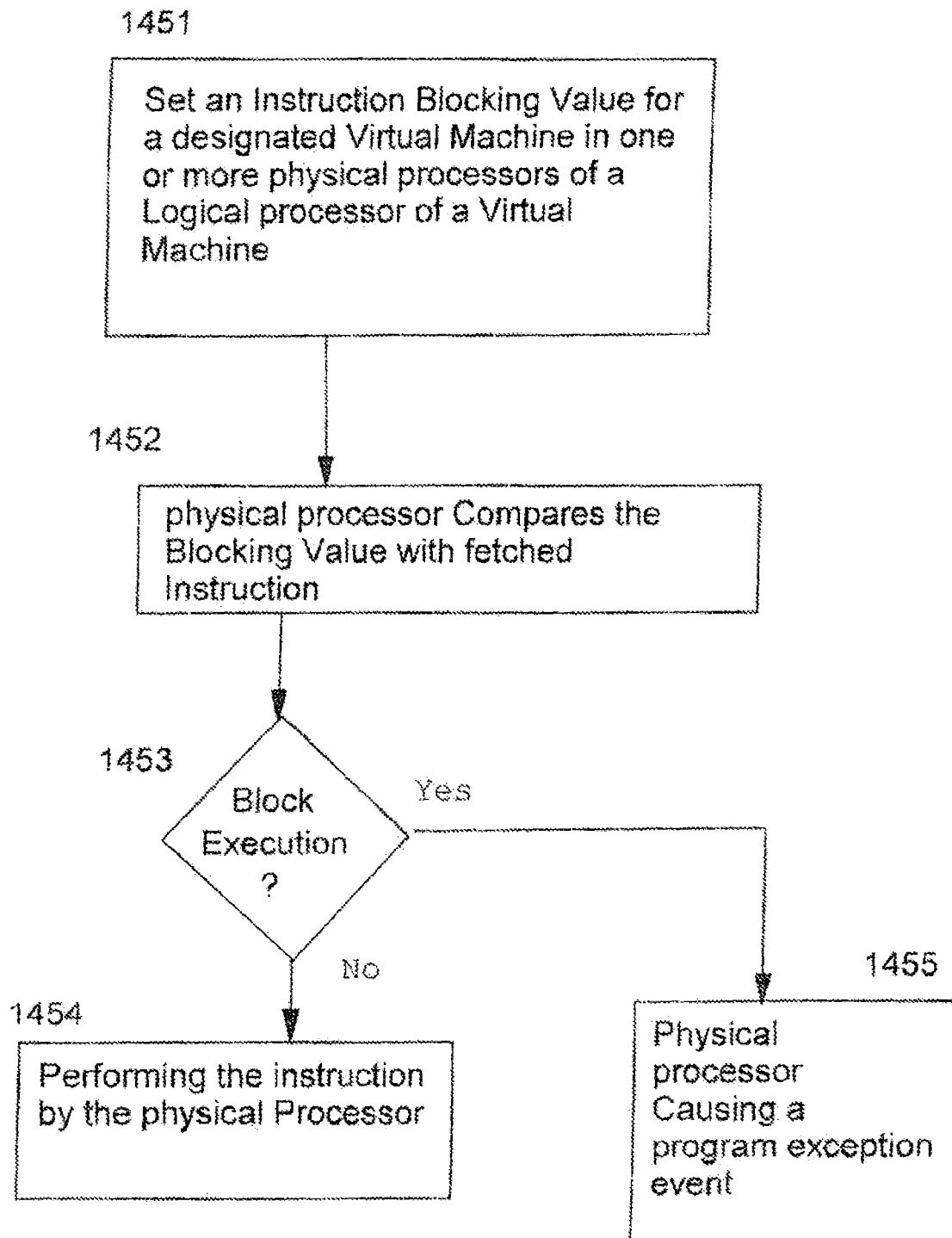

Referring to FIG. 14, in an embodiment, the processor is one or more physical processors of a logical processor of a virtual machine, wherein the instruction blocking value is set 1451 in the one or more physical processors, wherein the fetching is performed by the one or more physical processors. The Physical processor compares 1452 the instruction blocking value with the instruction to be executed to determine if the instruction is to be blocked, and the physical processor either performs the instruction 1454 or causes a program exception event 1455.

Figure 15:
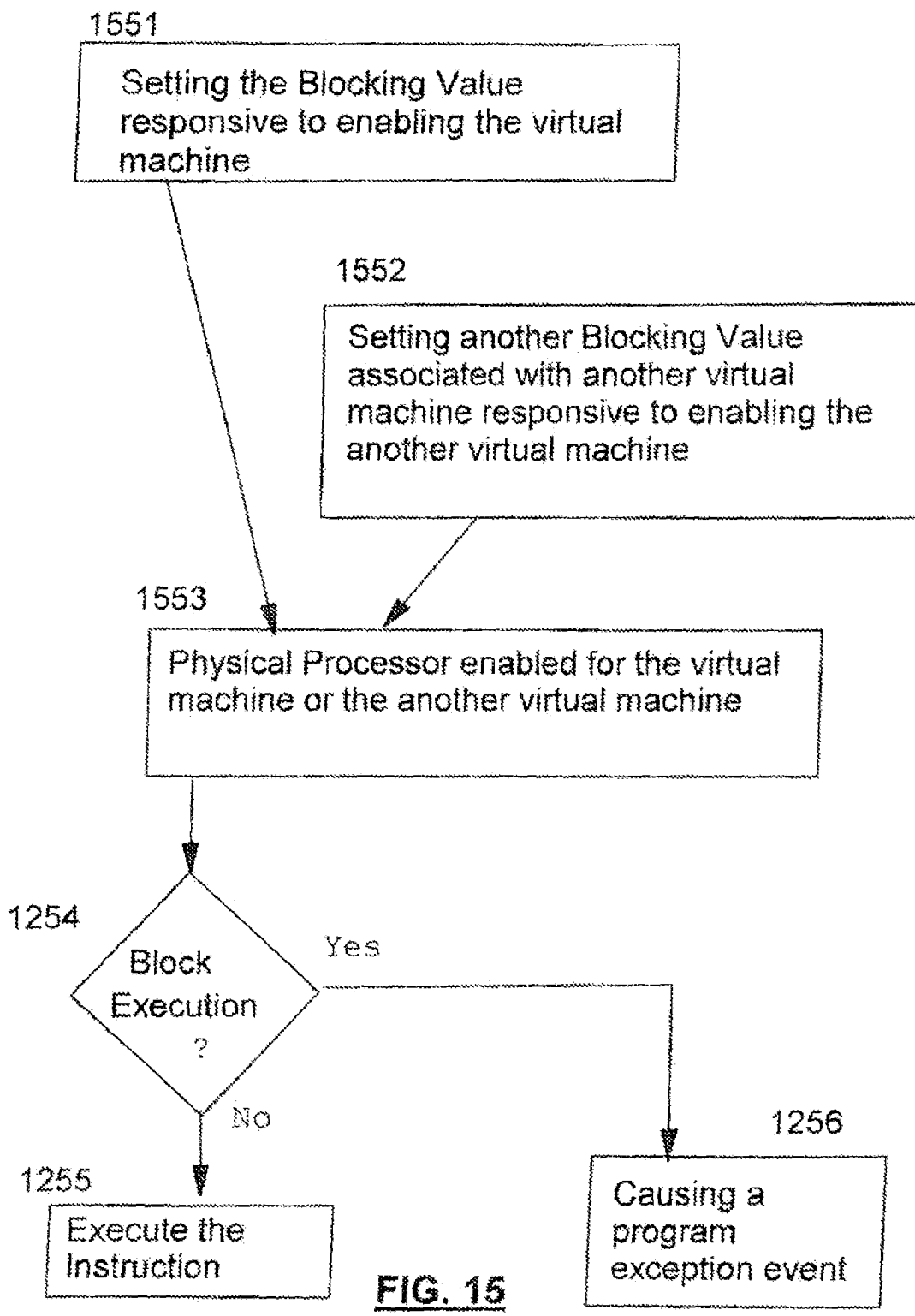

Referring to FIG. 15, in an embodiment, the instruction blocking value is defined for the virtual machine for blocking execution of the instruction, the setting 1551 the instruction blocking value responsive to the enabling the virtual machine to use the physical processor 1553, another instruction blocking value is set 1552, the another instruction blocking value defined for another virtual machine having another logical processor, the setting the another instruction blocking value responsive to the enabling the another virtual machine to use the physical processor 1553; and responsive to the another instruction blocking value permitting 1254 execution of the instruction, permitting execution 1255 of the instruction by the another logical processor; and responsive to the another instruction blocking value not permitting 1254 execution of the instruction, not permitting execution 1256 of the instruction by the another logical processor.

In an embodiment, the instruction blocking value is defined for the virtual machine for blocking execution of the instruction, the setting the instruction blocking value responsive to the enabling the virtual machine to use the physical processor, another instruction blocking value is set, the another instruction blocking value being defined for another virtual machine having another logical processor, the setting the another instruction blocking value responsive to the enabling the another virtual machine to use the physical processor; and responsive to the another instruction blocking value permitting execution of the instruction, permitting execution of the instruction by the physical processor while the another virtual machine is enabled to use the physical processor; and responsive to the another instruction blocking value not permitting execution of the instruction, not permitting execution of the instruction by the physical processor while the another virtual machine is enabled to use the physical processor.

Referring to FIG. 12, in an embodiment, the instruction 1258 is the permitted instruction responsive to the instruction 1258 employing a permitted function code associated with a selected function 1259 of a plurality of selectable functions, wherein the instruction is the not permitted instruction responsive to the instruction employing a not permitted function code, wherein function codes are specified by the instruction.

In an embodiment, a determination is made as to whether the instruction is the permitted instruction by associating the opcode of the instruction with the instruction blocking value.

In an embodiment, the instruction fetched specifies a function to be performed, the opcode of the instruction is used to index into a table to locate the instruction blocking value, the instruction blocking value comprising a permission field, the permission field is used to determine permitted functions. Responsive to the function being a permitted function, execution of the instruction is permitted and responsive to the function being a not permitted function, execution of the instruction is not permitted.

The forgoing may be useful in understanding the terminology and structure of one computer system embodiment. Embodiments may be not limited to the z/Architecture or to the description provided thereof. Embodiments can be advantageously applied to other computer architectures of other computer manufacturers with the teaching herein.

While preferred embodiments have been illustrated and described herein, it may be to be understood that embodiments may be not limited to the precise construction herein disclosed, and the right may be reserved to all changes and modifications coming within the scope of the invention as defined in the appended claims.

What is claimed is:

1. A computer program product for blocking specific instructions from being executed by a logical processor executing in a virtual machine, the logical processor configured to run on a physical processor, the computer program product comprising:

one or more non-transitory computer readable storage media and program instructions collectively stored on the one or more computer readable storage media to perform a method comprising:

setting an instruction blocking value in the logical processor, the instruction blocking value to block execution of instructions having certain function codes identified by the instruction blocking value, the instruction blocking value blocking execution of an instruction having a not permitted function code;

fetching, by the logical processor, an instruction to be executed by the logical processor, the instruction specifying an opcode and a function code of a plurality of function codes specifiable by the instruction, each function code specifying a function-to-be-performed, the plurality of function codes and the corresponding functions-to-be-performed being supported by the physical processor on which the logical processor is running, the opcode and the function code being separate from the instruction blocking value;

based on the instruction blocking value and the function code of the instruction fetched, determining that the function-to-be-performed is not a permitted function-to-be-performed; and blocking execution of the instruction fetched based on the determining that the function-to-be-performed is not a permitted function-to-be-performed, the blocking execution comprising causing a program exception event.

2. The computer program product of claim 1, wherein the instruction blocking value is set in one or more physical processors, and wherein the fetching is performed by the physical processor of the one or more physical processors.

3. The computer program product of claim 1, wherein the instruction blocking value is defined for the virtual machine and wherein the setting of the instruction blocking value is based on enabling the virtual machine to use the physical processor, the method further comprising:

based on enabling another virtual machine having another logical processor to use the physical processor, setting another instruction blocking value defined for the another virtual machine;

fetching by the another logical processor, another instruction to be executed by the another logical processor, the another instruction specifying another function code of the plurality of function codes specifiable by the another instruction;

based on the another instruction blocking value and the another function code, determining that another function-to-be-performed is another not permitted function-to-be-performed; and blocking execution of the another instruction fetched based on the determining that the another function-to-be-performed is not a permitted function-to-be-performed, the blocking execution comprising causing another program exception event.

4. The computer program product of claim 3, wherein the instruction blocking value indicates execution of a specific function-to-be-performed is to be blocked and the another instruction blocking value does not indicate the specific function-to-be-performed is to be blocked.

5. The computer program product of claim 1, wherein the instruction, based on another fetching of the instruction, is executed based on the instruction employing a permitted function code.

6. The computer program product of claim 1, wherein the method further comprises:

determining that the instruction in another execution is a permitted instruction by associating the opcode of the instruction with the instruction blocking value.

7. The computer program product of claim 1, wherein instruction fetched specifies a function to be performed, and wherein the method further comprises:

using the opcode of the instruction fetched to index into a table to locate the instruction blocking value, the instruction blocking value comprising a permission field;

using the permission field to determine permitted functions;

based on the function being a not-permitted function, determining that execution of the instruction is not permitted.

8. The computer program product of claim 1, wherein the physical processor is configured to perform the functions-to-be-performed of the plurality of function codes, and wherein the instruction blocking value prevents the logical processor, executing on the physical processor, from executing at least one of the functions-to-be-performed of the plurality of function codes.

9. The computer program product of claim 8, wherein only a subset of the function codes supported by the physical processor are made available to the logical processor, the method further comprising, based on the function-to-be-performed being a query-function for requesting identification of supported function codes, execution of the instruction further comprises returning only identification of function codes corresponding to functions-to-be-performed supported by the physical processor that do not correspond to to-blocked functions-to-be-performed.

10. The computer program product of claim 1, wherein the method further comprises:

interrogating an opcode table to determine that the function-to-be-performed is to be blocked, the interrogating comprising:

locating an entry in the opcode table having one field indicating the opcode of the instruction to be executed; and extracting the instruction blocking value from the entry.

11. The computer program product of claim 10, wherein the method further comprises:

comparing another field of the entry of the instruction blocking value extracted with a state description of the logical processor, the another field indicating an instruction machine level associated with the instruction, wherein the instruction was defined for the instruction machine level, the state description indicating a processor machine level of the logical processor; and based on the processor machine level of the logical processor being less than the instruction machine level associated with the instruction, blocking execution of the instruction fetched, having predefined function codes by the physical processor and causing a program exception event.

12. The computer program product of claim 11, wherein the method further comprises:

extracting function code blocking information from a selected field of the entry; and blocking execution of the instruction fetched, based on the function code blocking information extracted.

13. The computer program product of claim 9, wherein execution of the instruction further comprises not-returning identification of function codes not-corresponding to permitted functions-to-be-performed.

14. A computer system for blocking specific instructions from being executed by a logical processor executing in a virtual machine, the logical processor configured to run on a physical processor, the computer system comprising:

a memory; and at least one processor in communication with the memory, wherein the computer system is configured to perform a method, said method comprising:

setting an instruction blocking value in the logical processor, the instruction blocking value to block execution of instructions having certain function codes identified by the instruction blocking value, the instruction blocking value blocking execution of an instruction having a not permitted function code;

fetching, by the logical processor, an instruction to be executed by the logical processor, the instruction specifying an opcode and a function code of a plurality of function codes specifiable by the instruction, each function code specifying a function-to-be-performed, the plurality of function codes and corresponding functions-to-be-performed being supported by the physical processor on which the logical processor is running, the opcode and the function code being separate from the instruction blocking value;

based on the instruction blocking value and the function code of the instruction fetched, determining that the function-to-be-performed is not a permitted function-to-be-performed; and blocking execution of the instruction fetched based on the determining that the function-to-be-performed is not a permitted function-to-be-performed, the blocking execution comprising causing a program exception event.

15. The computer system of claim 14, wherein the instruction blocking value is set in the one or more physical processors, and the fetching is performed by the physical processor of one or more physical processors.

16. The computer system of claim 14, wherein the instruction blocking value is defined for the virtual machine and the setting of the instruction blocking value is based on enabling the virtual machine to use the physical processor, the method further comprising:

based on enabling another virtual machine having another logical processor to use the physical processor, setting another instruction blocking value defined for the another virtual machine;

fetching by the another logical processor, another instruction to be executed by the another logical processor, the another instruction specifying another function code of the plurality of function codes specifiable by the another instruction;

based on the another instruction blocking value and the another function code, determining that another function-to-be-performed is another not permitted function-to-be-performed; and blocking execution of the another instruction fetched based on the determining that the another function-to-be-performed is not a permitted function-to-be-performed, the blocking execution comprising causing another program exception event.

17. The computer system of claim 14, wherein the method further comprises:

determining that the instruction in another execution is a permitted instruction by associating the opcode of the instruction with the instruction blocking value.

18. The computer system of claim 14, wherein the instruction fetched specifies a function to be performed, and wherein the method further comprises:

using the opcode of the instruction fetched to index into a table to locate the instruction blocking value, the instruction blocking value comprising a permission field;

using the permission field to determine permitted functions; and based on the function being a not-permitted function, determining that execution of the instruction is not permitted.

19. The computer system of claim 14, wherein the instruction, based on another fetching of the instruction, is executed based on the instruction employing a permitted function code.

20. A computer-implemented method of blocking specific instructions from being executed by a logical processor executing in a virtual machine, the logical processor configured to run on a physical processor, the computer-implemented method comprising:

setting an instruction blocking value in the logical processor, the instruction blocking value to block execution of instructions having certain function codes identified by the instruction blocking value, the instruction blocking value blocking execution of an instruction having a not permitted function code;

fetching, by the logical processor, an instruction to be executed by the logical processor, the instruction specifying an opcode and a function code of a plurality of function codes specifiable by the instruction, each function code specifying a function-to-be-performed the plurality of function codes and corresponding functions-to-be-performed being supported by the physical processor on which the logical processor is running the opcode and the function code being separate from the instruction blocking value;

based on the instruction blocking value and the function code of the instruction fetched, determining that the function-to-be-performed is not a permitted function-to-be-performed; and blocking execution of the instruction fetched based on the determining that the function-to-be-performed is not a permitted function-to-be-performed, the blocking execution comprising causing a program exception event.

21. The computer-implemented method of claim 20, wherein the instruction blocking value is defined for the virtual machine and the setting of the instruction blocking value is based on enabling the virtual machine to use the physical processor, further comprising:

based on enabling another virtual machine having another logical processor to use the physical processor, setting another instruction blocking value defined for the another virtual machine;

fetching by the another logical processor, another instruction to be executed by the another logical processor, the another instruction specifying another function code of the plurality of function codes specifiable by the another instruction;

based on the another instruction blocking value and the another function code, determining that another function-to-be-performed is another not permitted function-to-be-performed; and blocking execution of the another instruction fetched based on the determining that the another function-to-be-performed is not a permitted function-to-be-performed, the blocking execution comprising causing another program exception event.

22. The computer-implemented method of claim 20, wherein the method further comprises:

determining that the instruction in another execution is a permitted instruction by associating the opcode of the instruction with the instruction blocking value.

23. The computer-implemented method of claim 20, wherein the instruction blocking value is set in one or more physical processors, and wherein the fetching is performed by the physical processor of the one or more physical processors.

24. The computer-implemented method of claim 20, wherein the instruction fetched specifies a function to be performed, and wherein the method further comprises:

using the opcode of the instruction fetched to index into a table to locate the instruction blocking value, the instruction blocking value comprising a permission field;

using the permission field to determine permitted functions; and based on the function being a not-permitted function, determining that execution of the instruction is not permitted.

25. The computer-implemented of method of claim 20, wherein the instruction, based on another fetching of the instruction, is executed based on the instruction employing a permitted function code.

* * * * *